(12) United States Patent
Keith et al.

(10) Patent No.: US 8,119,091 B2
(45) Date of Patent: Feb. 21, 2012

(54) CARBON DIOXIDE CAPTURE

(75) Inventors: David Keith, Calgary (CA); Maryam Mahmoudkhani, Calgary (CA)

(73) Assignee: Carbon Engineering Limited Partnership, Calgary, AB (CA)

( * ) Notice: Subject to any disclaimer, the term of this patent is extended or adjusted under 35 U.S.C. 154(b) by 120 days.

(21) Appl. No.: 12/488,230

(22) Filed: Jun. 19, 2009

(65) Prior Publication Data

US 2010/0034724 A1 Feb. 11, 2010

Related U.S. Application Data

(60) Provisional application No. 61/074,458, filed on Jun. 20, 2008.

(51) Int. Cl.
| | |
|---|---|
| C01D 7/00 | (2006.01) |
| C01D 7/24 | (2006.01) |
| C01D 7/35 | (2006.01) |
| B01D 53/14 | (2006.01) |
| B01D 53/62 | (2006.01) |
| B01D 53/75 | (2006.01) |
| B01D 53/77 | (2006.01) |
| C01B 31/24 | (2006.01) |
| C01B 31/20 | (2006.01) |
| C01G 23/04 | (2006.01) |

(52) U.S. Cl. ........ 423/421; 423/220; 423/225; 423/230; 423/419.1; 423/437.1; 423/438; 423/598; 95/149; 95/205; 95/230; 95/236

(58) Field of Classification Search ................... 423/220, 423/225, 230, 419.1, 421, 437.1, 438, 598; 95/149, 205, 230, 236
See application file for complete search history.

(56) References Cited

U.S. PATENT DOCUMENTS

| | | | |
|---|---|---|---|
| 4,000,264 A | 12/1976 | Nagano et al. | |
| 4,183,901 A * | 1/1980 | Ilardi et al. ................. | 423/206.2 |
| 4,251,494 A | 2/1981 | Say | |
| 4,344,650 A | 8/1982 | Pinsky et al. | |
| 4,401,635 A | 8/1983 | Frint | |
| 4,632,760 A | 12/1986 | Hanson et al. | |
| 5,283,054 A * | 2/1994 | Copenhafer et al. ....... | 423/206.2 |
| 5,582,683 A | 12/1996 | Bonsu et al. | |
| 5,679,131 A | 10/1997 | Obushenko | |

(Continued)

FOREIGN PATENT DOCUMENTS

WO 2006/009600 1/2006

(Continued)

OTHER PUBLICATIONS

Magnus Palm et al., "Kinetic study of the direct causticization reaction involving titanates and titanium dioxide," Chemical Engineering Journal. 1997, vol. 68, pp. 87-94.

(Continued)

*Primary Examiner* — Stuart Hendrickson
*Assistant Examiner* — Daniel Berns
(74) *Attorney, Agent, or Firm* — Fish & Richardson P.C.

(57) ABSTRACT

A method of carbon dioxide capture is disclosed. In a step (a) anhydrous sodium carbonate is separated from a first aqueous solution formed by reacting carbon dioxide and an aqueous solution of sodium hydroxide. In step (b) the anhydrous sodium carbonate is treated by causticization to generate carbon dioxide and sodium hydroxide. The first aqueous solution of step (a) is formed by scrubbing a gas containing carbon dioxide with an aqueous solution of sodium hydroxide.

17 Claims, 19 Drawing Sheets

U.S. PATENT DOCUMENTS

| | | |
|---|---|---|
| 6,428,759 B1 | 8/2002 | Smith et al. |
| 7,214,290 B2 | 5/2007 | Duesel, Jr. et al. |
| 7,314,847 B1 | 1/2008 | Siriwardare |
| 2006/0051274 A1 | 3/2006 | Wright et al. |
| 2008/0011161 A1 | 1/2008 | Finkenrath et al. |
| 2008/0031801 A1 | 2/2008 | Lackner et al. |
| 2010/0064890 A1 | 3/2010 | Keith et al. |

FOREIGN PATENT DOCUMENTS

| | | |
|---|---|---|
| WO | 2007/075399 | 7/2007 |
| WO | WO 2008/042919 | 4/2008 |

OTHER PUBLICATIONS

Le Zeng et al., "A Mathematic Model for Direct Causticization of Na2C03 with Ti02 in a Semi-batch Reactor," *The Canadian Journal of Chemical Engineering*, Oct. 2002, vol. 80, pp. 948-953.

Ingrid Nohlgren et al., "Model study of the direct causticization reaction between sodium trititanate and sodium carbonate," *The Canadian Journal of Chemical Engineering*, Jun. 2000, vol. 78, pp. 529-539.

International Search Report and Written Opinion of the International Searching Authority, PCT Application Serial No. PCT/US2009/047999, Jan. 29, 2010, 11 pp.

International Preliminary Report on Patentability and Written Opinion of the International Searching Authority from International Application No. PCT/US2009/047999, mailed Dec. 21, 2010, 6 pages.

International Search Report and Written Opinion of the International Searching Authority, PCT Application Serial No. PCT/US2009/0054626, Apr. 5, 2010, 11 pp.

Authorized officer Dorothée Millhausen, International Preliminary Report on Patentability in PCT/GB2007/050762 mailed Jul. 2, 2009, 7 pages.

Baciocchi et al., "Process design and energy requirement for the capture of carbon dioxide from air," *Chem. Eng. Proc.*, 2006, 45:1047-1058.

Canadell et al., "Contributions to accelerating atmospheric $CO_2$ growth from economic activity, carbon intensity, and efficiency of natural sinks," *Pro. Natl. Acad. Sci. USA*, 2007, 104(47):18866-18870.

Chen and van Heiningen, "Kinetics of the direct causticizing reaction between sodium carbonate and titanium dioxide or sodium tri-titanate," *J. Pulp Paper Sci.*, 2006, 32(4):245-251.

Covey, "Development of the direct alkali recovery system and potential application," *Pulp Pap. Canada*, 1982, 83(12):T350-T354.

Hoddenbagh et al., "Borate causticizing: a cost effective technology," *Pulp Pap. Canada*, 2002, 103(11):T283-T289.

Kiiskilä, "Recovery of sodium hydroxide from alkaline pulping liquors by smelt causticizing, Part II. Recations between sodium carbonate and titanium dioxide," *Paperi ja Puu, Papper och Trä*, 1979, 5:394-401.

Kiiskilä, "Recovery of sodium hydroxide from alkaline pulping liquors by smelt causticizing, Part III. Alkali distribution in titanium dioxide causticizing," *Paperi ja Puu, Papper och Trä*, 1979, 6:453-464.

Lackner et al., "Capturing carbon dioxide from air," $24^{th}$ *Annual Technical Conference on Coal Utilization*, 1999, Clearwater, FL.

Maddern, "Mill-scale development of the DARS direct causticization process," *Pulp Pap. Canada*, 1986, 87(10):T395-399.

Mahmoudkhani et al., "Low energy packed tower and caustic recovery for direct capture of $CO_2$ from air," *Energy Procedia*, 2009, 1:1535-1542.

Mahmoudkhani and Keith, "Low-energy sodium hydroxide recovery for $CO_2$ capture from atmospheric air-Thermodynamic analysis," *Int. J. Greenhouse Gas Control*, 2009, 3:376-384.

Nohlgren, "Recovery of kraft black liquor with direct causticization using titanates," Ph.D. Thesis, Lulea University of Technology, Lulea, Sweden, 2002.

Palm and Theliander, "Kinetic study of the direct causticization reaction involving titanates and titanium dioxide," *Chem. Eng. J.*, 1997, 68:87-94.

Sinquefield et al., "Borate auto-causticization for low and high temperature black liquor gasification," *International Chemical Recovery Conference*, Jun. 6-10, 2004, Charleston, SC.

Spector and Dodge, "Removal of carbon dioxide from atmospheric air," *Trans. Am. Inst. Chem. Eng.*, 1946, 42:827-848.

Stolaroff et al., "Carbon dioxide capture from atmospheric air using sodium hydroxide spray," *Environ. Sci. Technol.*, 2008, 42:2728-2735.

Tepe and Dodge, "Absorption of carbon dioxide by sodium hydroxide solutions in a packed column," *Trans. Am. Inst. Chem. Eng.*, 1943, 39:255-276.

Yusuf and Cameron, "Decarbonization reactions between sodium metaborate and sodium carbonate," *Ind. Eng. Chem. Res.*, 2004, 43:8148-8154.

Zeman, "Direct Extraction of CO2 from Air, a Fixed Solution for a Mobile Problem," *The First Regional Symposium on Carbon Management*, May 23, 2006, Dhahran, Saudi Arabia.

Zeman, "Energy and material balance of $CO_2$ capture from ambient air," *Environ. Sci. Technol.*, 2007, 41(21):7558-7563.

Zeman and Lackner, "Capturing carbon dioxide directly from the atmosphere," *World Resource Review*, 2004, 16(2):157-172.

Zeng and van Heiningen, "Pilot fluidized-bed testing of kraft black liquor gasification and its direct causticization with $TiO_2$," *J. Pulp Paper Sci.*, 1997, 23(11):J511-J516.

Zou, "Recovery of kraft black liquor including direct causticization," Ph.D. Thesis, McGill University, Montreal, Quebec, 1991.

\* cited by examiner

CARBON DIOXIDE CAPTURE

CROSS-REFERENCE TO RELATED APPLICATIONS

This application claims priority to U.S. Provisional Application Ser. No. 61/074,458, filed on Jun. 20, 2008, which is incorporated by reference in its entirety herein.

TECHNICAL FIELD

This document relates to carbon dioxide capture systems and methods, including low-energy sodium hydroxide recovery for $CO_2$ capture from atmospheric air. This document relates to causticization processes which can be incorporated into carbon capture and storage strategies.

BACKGROUND

Introduction

To avoid dangerous climate change, the growth of atmospheric concentrations of carbon dioxide must be halted, and may have to be reduced. The concentration of carbon dioxide, the most important greenhouse gas, has increased from about 280 ppm in the preindustrial age to more than 385 ppm and it is now increasing by more than 2 ppm per year driven by global $CO_2$ emissions that are now increasing at more than 3.3% per year (Canadell et al., 2007).

Carbon capture and storage (CCS) technologies target $CO_2$ removal from large fixed-point sources such as power plants. Dispersed sources, however, emit more than half of global $CO_2$ emissions. Direct capture of $CO_2$ from ambient air, "air capture", is one of the few methods capable of systematically managing dispersed emissions. Therefore, while air capture is more expensive than capture from large point sources it remains important as it will primarily compete with emission reductions from dispersed sources such as transportation which can be very expensive to mitigate.

1.1 Air Capture

Carbon dioxide absorption from atmospheric air using alkaline solutions has been explored for half a century (Spector and Dodge 1946, Tepe and Dodge 1943). Large scale scrubbing of $CO_2$ from ambient air was first suggested by Lackner in the late 1990's (Lackner et al., 1999). In wet scrubbing techniques, $CO_2$ is absorbed into a solution of sodium hydroxide, NaOH, and is leaving behind an aqueous solution of sodium hydroxide and sodium carbonate, $Na_2CO_3$. For this process, the contactor, as the component of the system that provides the contacts between $CO_2$ and sodium hydroxide, has thus far been a point of contention. Large convective tower (Lackner et al., 1999), and packed scrubbing towers (Baciocchi et al., 2006 and Zeman, 2007) are the most commonly suggested contactor designs. A packed tower equipped with Sulzer Mellapak has been investigated by Baciocchi et al. (2006) to absorb $CO_2$ from air with an inlet concentration of 500 ppm to an outlet concentration of 250 ppm using a 2M NaOH solution.

An alternative strategy, suggested by Stolaroff et al. (2007), is to generate a fine spray of the absorbing solution for providing large surface to the air flow through an open tower. This strategy could have the potential to operate with a small pressure drop in air and avoids the capital cost of packing material. Stolaroff et al. (2007) studied the feasibility of a NaOH spray-based contactor by estimating the cost and energy requirement per unit $CO_2$ captured. Water loss, as a major concern in this design, was addressed and it was found that the water loss could be managed by adjusting of the NaOH concentration with temperature and humidity of air, i.e. the higher the concentration of sodium hydroxide, the lower the water loss, e.g. using ~7.2M NaOH, at 15° C. and 65% relative humidity, eliminates water loss.

1.2 Caustic Recovery for Air Capture

Conversion of sodium carbonate into sodium hydroxide, so-called causticization, is one of the oldest chemical processes. In Kraft Pulping for paper making, wood is digested using sodium hydroxide to liberate cellulose and produce pulp. The remaining solution, so-called "black liquor", consists of other, mainly organic materials originating from the wood, (e.g. lignin) along with sodium carbonate. To convert sodium carbonate and recover NaOH the conventional causticization process using lime ($Ca(OH)_2$) has been used on a continuous basis for more than 80 years.

In air capture processes, the aqueous solution of sodium carbonate and concentrated sodium hydroxide must be converted to fresh sodium hydroxide and gaseous $CO_2$ to be used for disposal or fuels. To convert sodium carbonate to sodium hydroxide, and regenerate the reservoir solution, a conventional causticization technique using lime ($Ca(OH)_2$) has, thus far, been addressed (Baciocchi, et al., 2006, Stolaroff et al., 2007 and Zeman, 2007). In conventional chemical recovery, $Na_2CO_3$ is causticized with lime to form NaOH and lime mud ($CaCO_3$), reaction [1]. The conversion of $Na_2CO_3$ to NaOH and regeneration of lime is a series of liquid-solid reactions, reactions [1] to [3], i.e. all involved calcium compounds are solids.

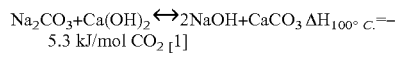

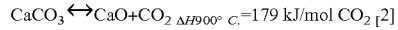

Conventional causticization would require ~170 kJ/mol $CO_2$ for drying and heating the reactant, $CaCO_3$, to the reaction temperature and 179 kJ/mol $CO_2$ for reaction [2]. Comparing the high temperature energy required to regenerate NaOH using conventional causticization with the thermodynamic minimum required energy given by the enthalpy of the reaction for absorption of $CO_2$ from air into sodium hydroxide solution, it can be seen that the required energy for conventional causticization is far beyond the thermodynamic minimum, i.e. the enthalpy of the reaction for absorption of $CO_2$ from air into sodium hydroxide solution for a nominal 1 molar solution and at 298K and a pressure of 1 bar is −109.4 kJ/mol $CO_2$ which implies that to go from sodium carbonate to sodium hydroxide the thermodynamic minimum required energy is 109.4 kJ/mol $CO_2$ (Zeman and Lackner, 2004).

As a tool for air capture, conventional causticization has several major drawbacks including:
  a comparatively large demand for high-temperature heat,
  a causticization efficiency limited to 80-90%, and
  the alkalinity of the regenerated NaOH solution limited to about 1 mol/L.

Methods introducing alternative causticization processes have been widely investigated in the pulp and paper industry. Auto-causticization (using borate), direct causticization (using iron oxide or titanium dioxide) or partially auto- or direct-causticization has been addressed in a number of literature articles (Covey, 1982, Hoddenbagh et al., 2002, Kiiskilä, 1979a, 1979b, Nagano et al., 1974, Maddern, 1986, Palm and Theliander, 1997, Sinquefield et al., 2004, Yusuf and Cameron 2004 and Zou, 1991). The term "auto-causticization" may be used when the reaction product is water soluble and the decarbonizing agent is carried out through the entire pulping and recovery cycle as a caustic solution. In this process the caustic solution causticized itself during combustion or gasification. The term direct causticization may be used when the reaction product is insoluble in a caustic solution and the decarbonizing agent is separated from the caustic solution and is not carried through the liquor cycle. In this process the decarbonizing agent is added and subsequently removed.

The most commonly proposed method for air capture is a wet scrubbing technique which absorbs $CO_2$ in an alkaline absorbent, i.e. sodium hydroxide producing an aqueous solution of sodium hydroxide and sodium carbonate. Most previous work has assumed that the absorbent would be regenerated and $CO_2$ liberated from the alkaline carbonate solution using a lime ($Ca(OH)_2$) and calcium carbonate causticization cycle.

SUMMARY

The methods described herein are described in terms of various steps which, as a person of ordinary skill in the art would recognize from reading the specification, can be performed individually, simultaneously, for example, in one pot, or in any combination thereof.

A method of carbon dioxide capture is disclosed. In a step (a), gas containing carbon dioxide is scrubbed with an aqueous solution of sodium hydroxide to react the carbon dioxide to form a first aqueous solution containing sodium carbonate. In step (b) anhydrous sodium carbonate is separated from the first aqueous solution. In step (c) the anhydrous sodium carbonate is treated by causticization to generate carbon dioxide and sodium hydroxide. In some embodiments, causticization comprises at least one of auto-causticization and direct causticization.

In some embodiments, step (c) further comprises step (c1) and (c2). In step (c 1), the anhydrous sodium carbonate is reacted with sodium tri-titanate to produce carbon dioxide gas and sodium penta-titanate. In step (c2) sodium hydroxide and sodium tri-titanate are regenerated from the sodium penta-titanate.

A method of making anhydrous sodium carbonate from a first aqueous solution containing sodium carbonate is also disclosed. In some embodiments, step (b) can comprise step (x) and (y). In step (x), a hydrate of sodium carbonate is separated from the first aqueous solution. In step (y), the hydrate of sodium carbonate is dissolved in a second aqueous solution and the second aqueous solution is heated to at or above the transition temperature of monohydrate sodium carbonate and anhydrous sodium carbonate precipitation to produce the anhydrous sodium carbonate. In some embodiments, step (y) further comprises introducing at least one secondary solute to the second aqueous solution to lower the solubility of the anhydrous sodium carbonate. In some embodiments, the anhydrous sodium carbonate produced in step (y) is treated by causticization to generate carbon dioxide and sodium hydroxide.

A method of carbon dioxide capture is also disclosed. In a step (a), a gas containing carbon dioxide is scrubbed with an aqueous solution of an alkali metal hydroxide to react the carbon dioxide to form a first aqueous solution containing alkali metal carbonate. In a step (b), anhydrous alkali metal carbonate is separated from the first aqueous solution. In a step (c) the anhydrous alkali metal carbonate is treated by causticization to generate carbon dioxide and alkali metal hydroxide. In some embodiments, the alkali metal comprises at least one alkali metal. In some embodiments, the alkali metal hydroxide comprises potassium hydroxide.

Disclosed herein is a novel technique for recovering of sodium hydroxide from an aqueous alkaline solution of sodium carbonate. In the first step anhydrous sodium carbonate is separated from the concentrated sodium hydroxide solution using a two step precipitation and crystallization process. The anhydrous sodium carbonate is then causticized using sodium tri-titanate. In the causticization process, sodium hydroxide is regenerated and carbon dioxide is liberated as a pure stream, which is compressed for use or disposal. The technique requires ~50% less high-grade heat than conventional causticization and the maximum temperature required is reduced by at least 50° C. This titanate process may allow a substantial reduction in the overall cost of direct air capture.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

Embodiments will now be described with reference to the figures, in which like reference characters denote like elements, by way of example, and in which.

| a-b | Heating $Na_2CO_{3(aq)}$ | 1-2 | Heating moisture content of $CaCO_3$ |
| b-c | Heating $Na_2CO_{3(s)}$ and $Na_2O \cdot 3TiO_2$ | 2-3 | Vaporizing moisture |
| c-d | Decarbonation reaction | 3-4 | Heating $CaCO_{3(s)}$ |
| d-e | Cooling $CO_{2(g)}$ and $4Na_2O \cdot 5TiO_2$ | 4-5 | Calcination reaction |
|     |                        | 5-6 | Cooling $CaO_{(s)}$ and $CO_{2(g)}$ |
| e-f | Leaching reaction      | 6-7 | Slaking reaction |
|     |                        | 7-8 | Cooling $CO_{2(g)}$ |

Figure 3:
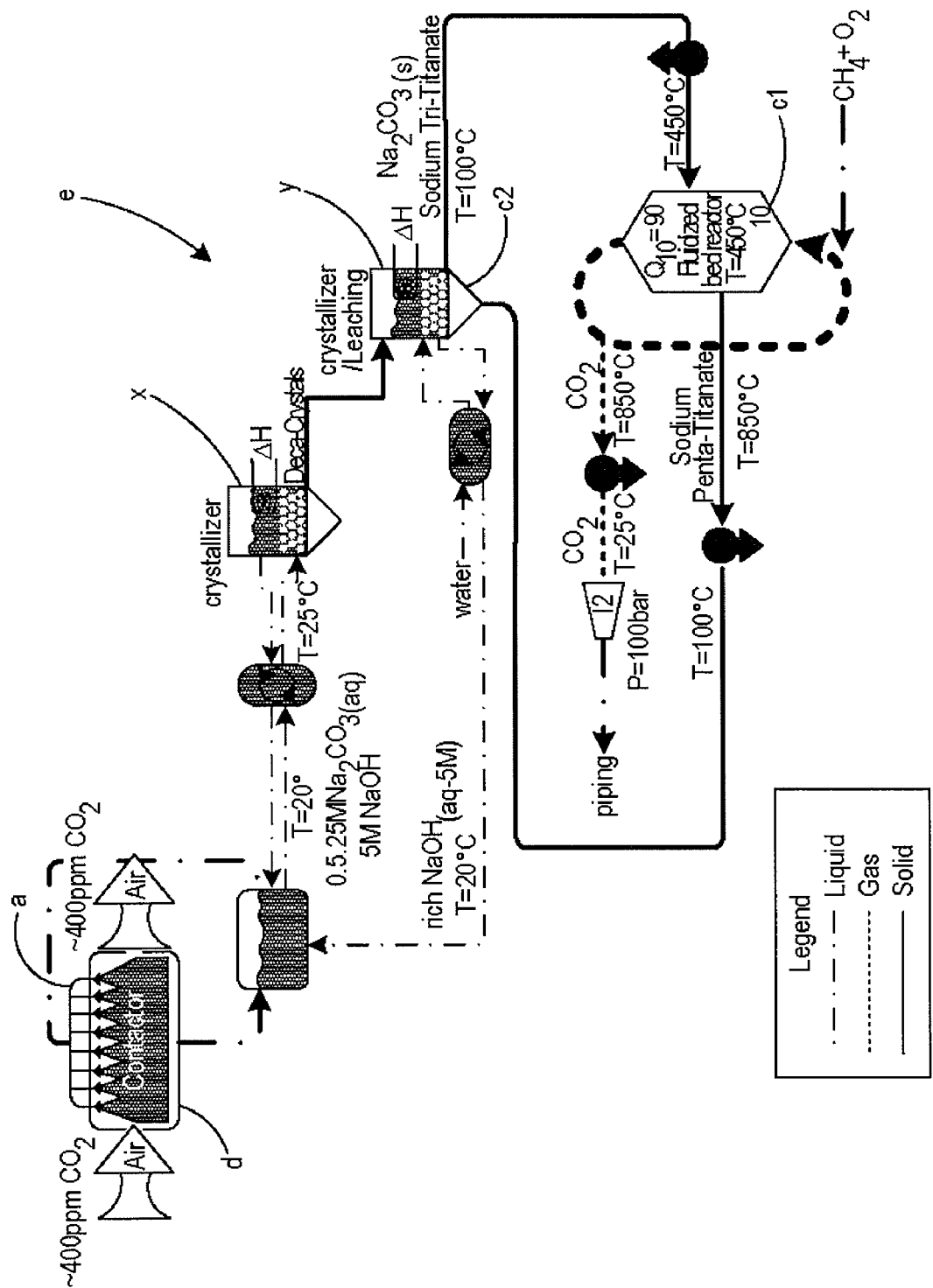
FIG. 3: An embodiment of a process design for air capture using a titanate chemical recovery cycle.
Figure 8:
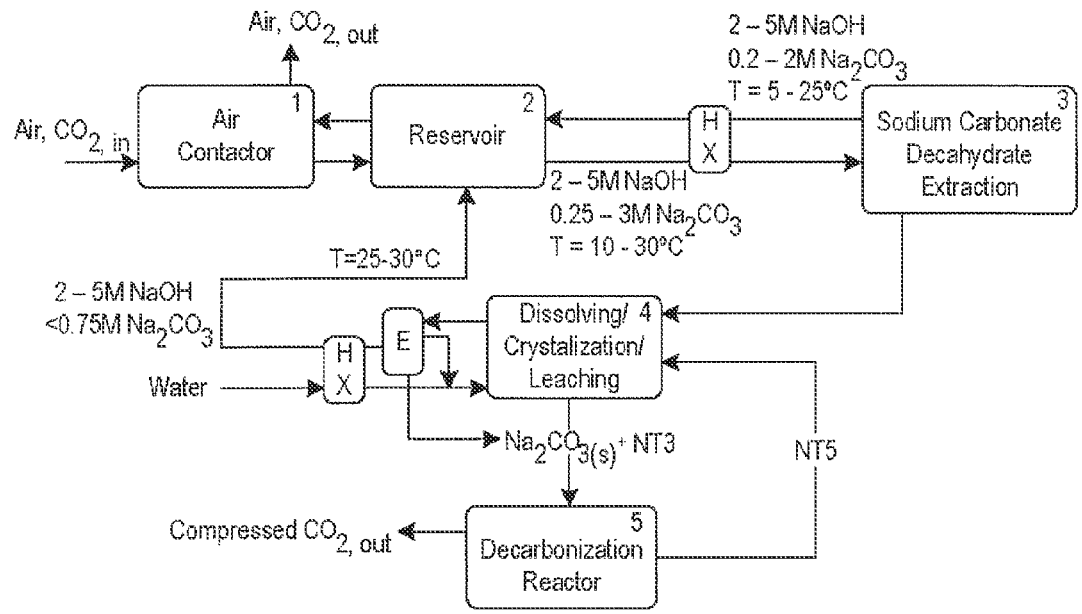

FIG. 8 is a schematic of one embodiment of a process as illustrated in FIG. 3.

Figure 2:
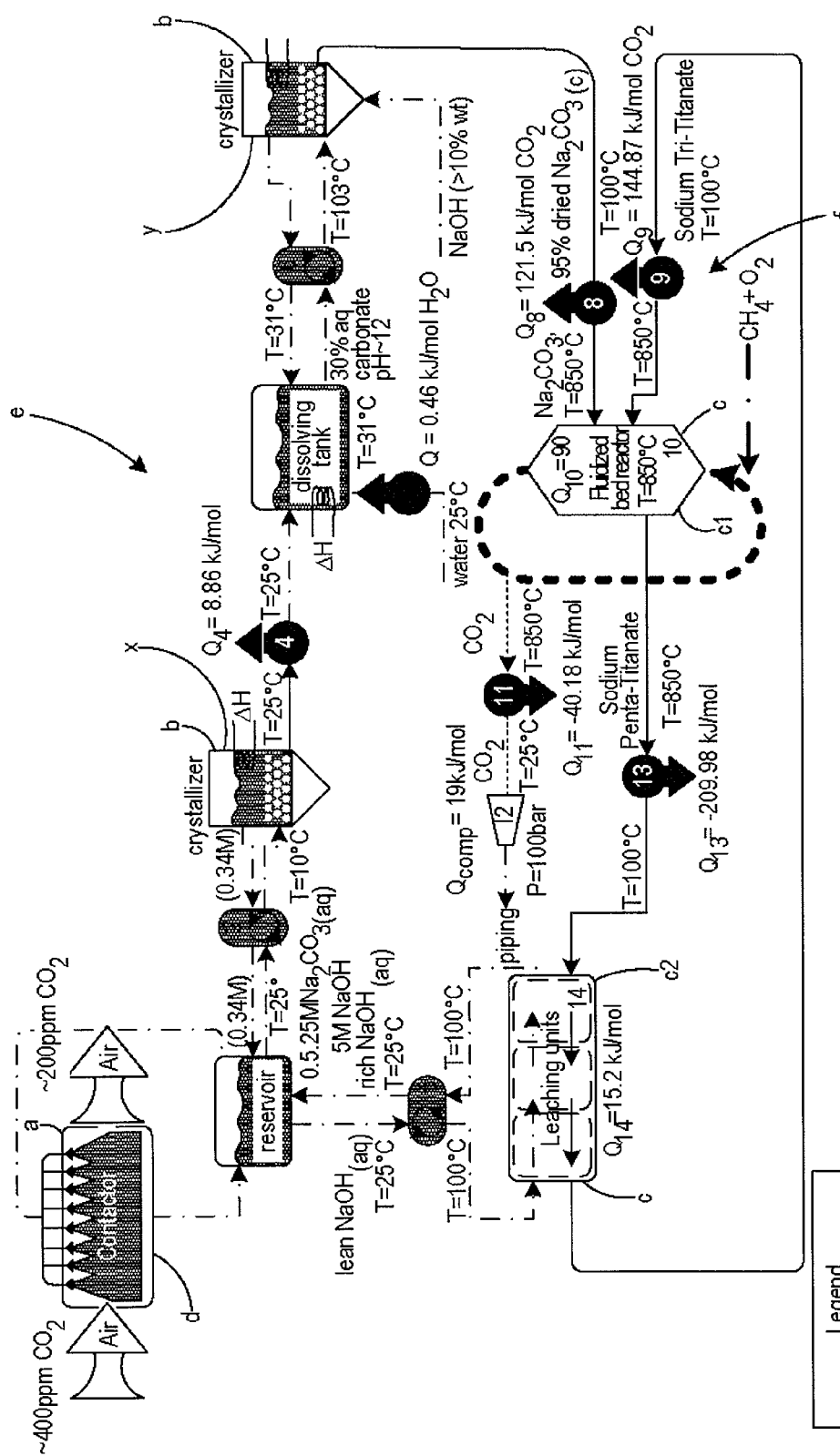
FIG. 2: An embodiment of a process design for air capture using a titanate chemical recovery cycle.
Figure 9:
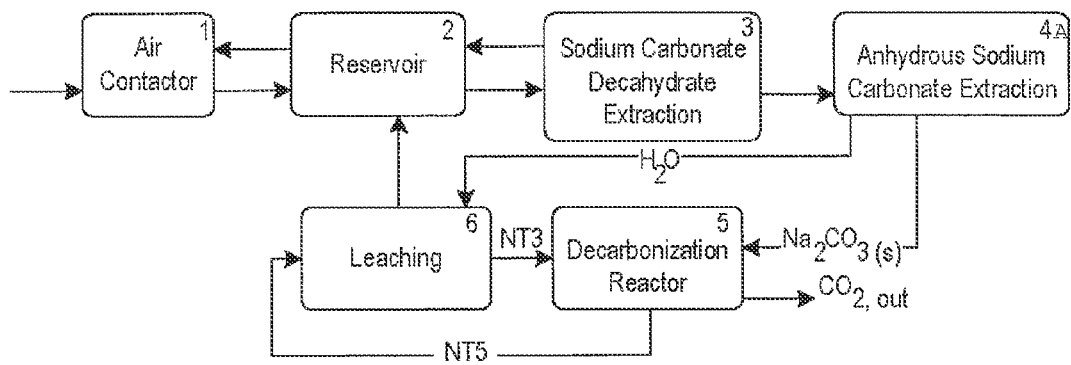

FIG. 9 is a schematic of one embodiment of a process as illustrated in FIG. 2.

Figure 10:
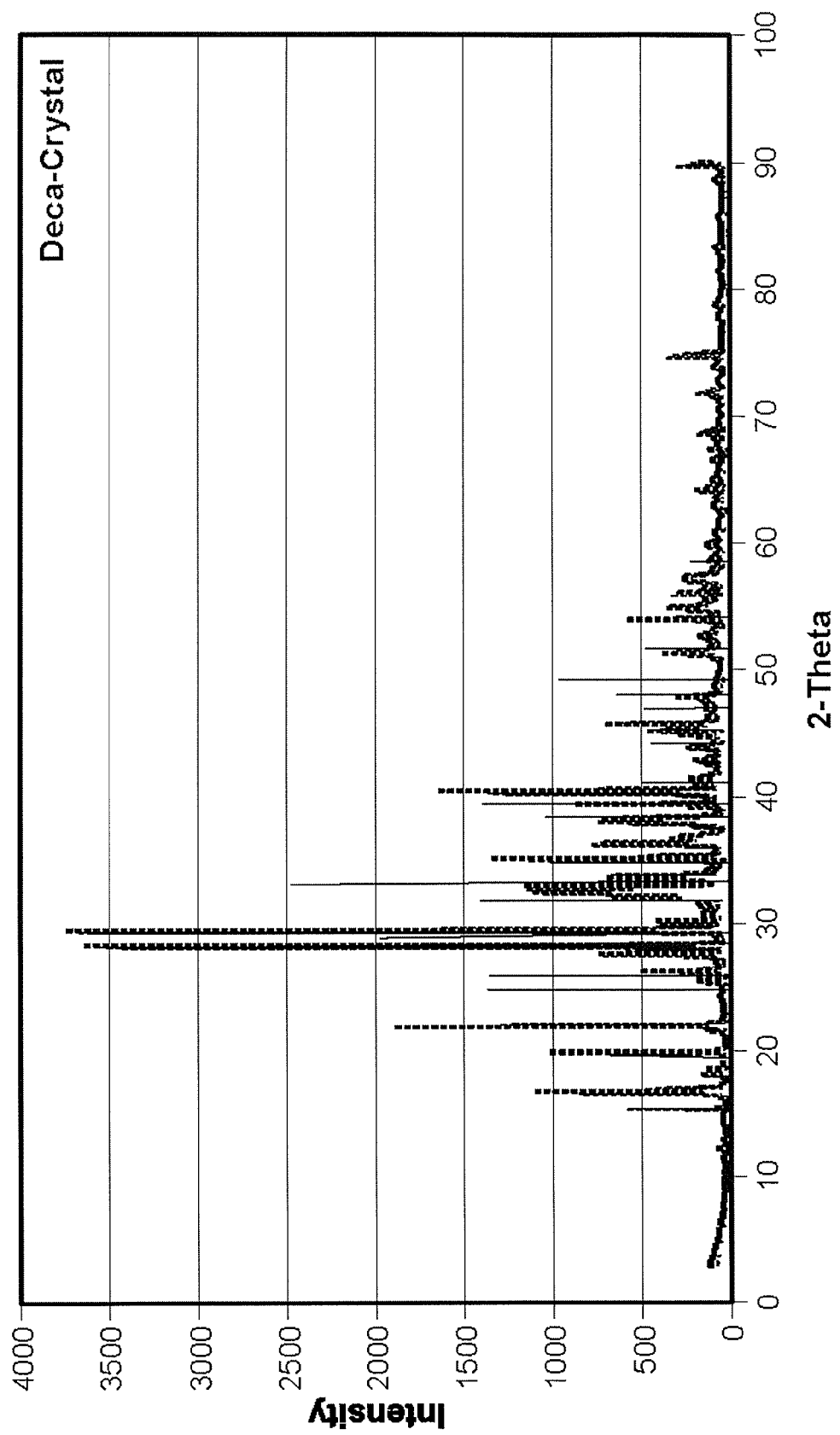

FIG. 10 is an XRD (X-ray diffractometery) graph of sodium carbonate decahydrate.

Figure 11:
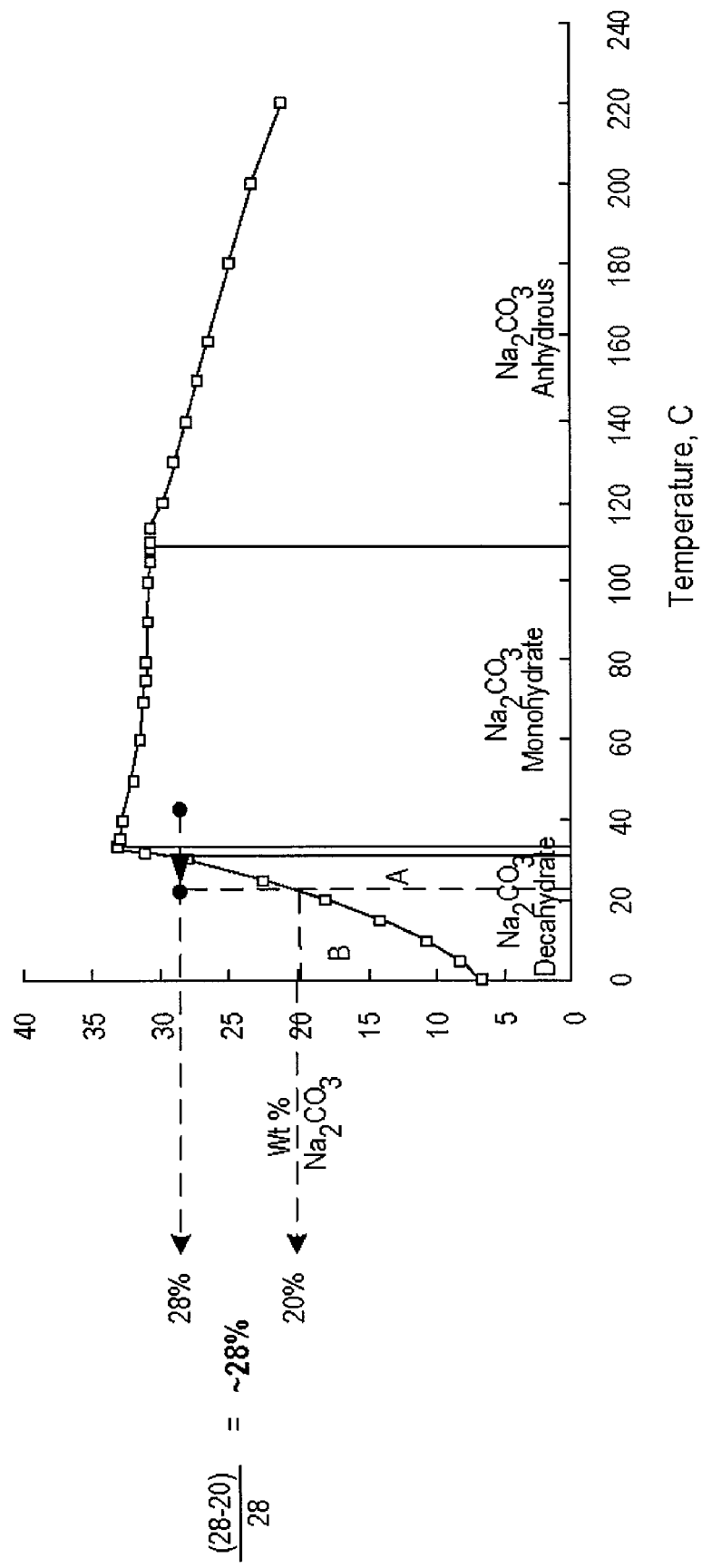

FIG. 11 is a graph of the solubility of $Na_2CO_3$ in water, with calculations made for one example described in the detailed description.

Figure 12:
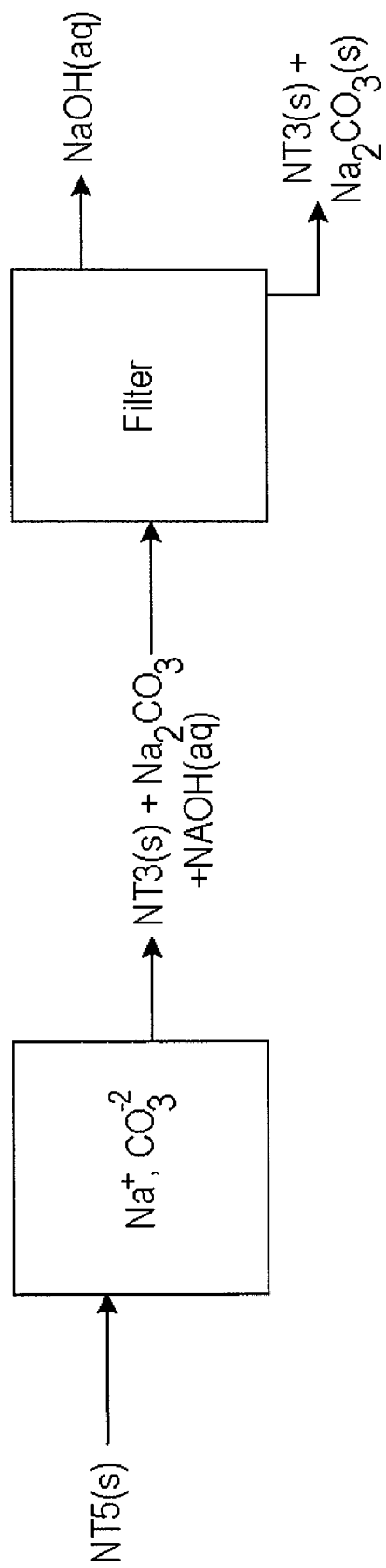

FIG. 12 is a flow diagram of the simultaneous leaching and anhydrous $Na_2CO_3$ reaction.

Figure 13:
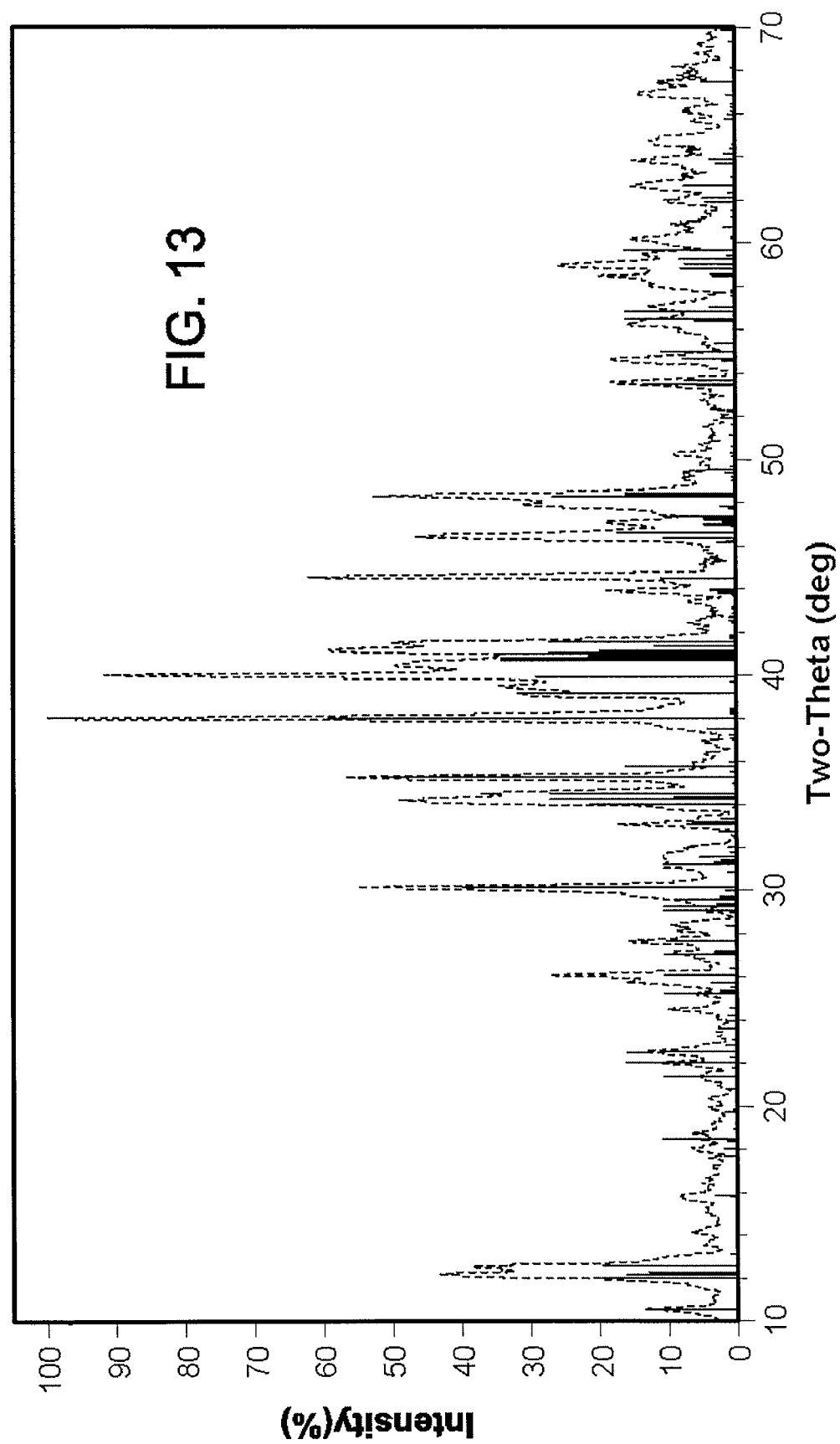

FIG. 13 is an XRD graph of the filter cake from the leaching test where the final concentration of NaOH was 5M.

Figure 14:
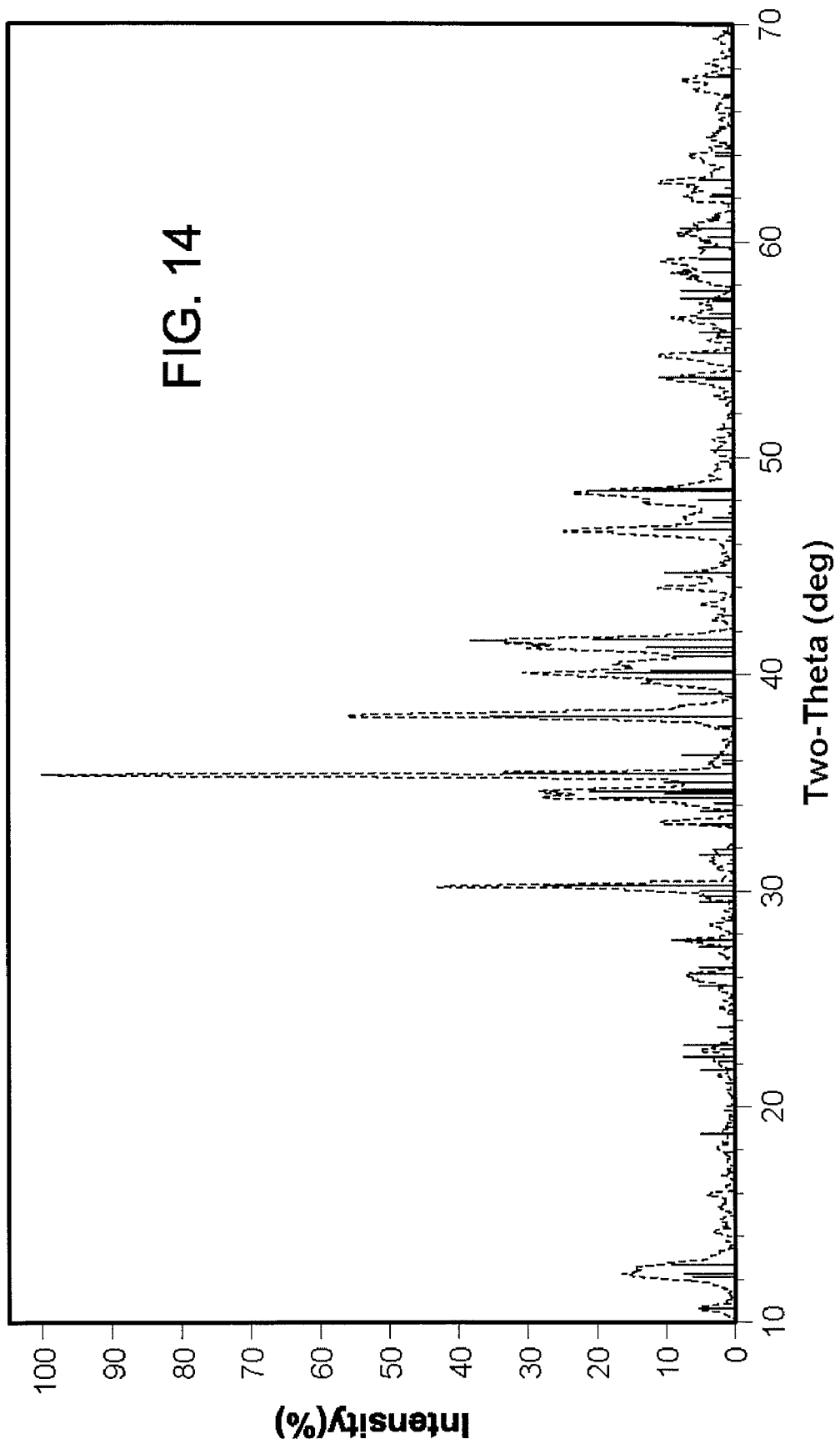

FIG. 14 is an XRD graph of the filter cake from the leaching test where the final concentration of NaOH was 3M.

Figure 15:
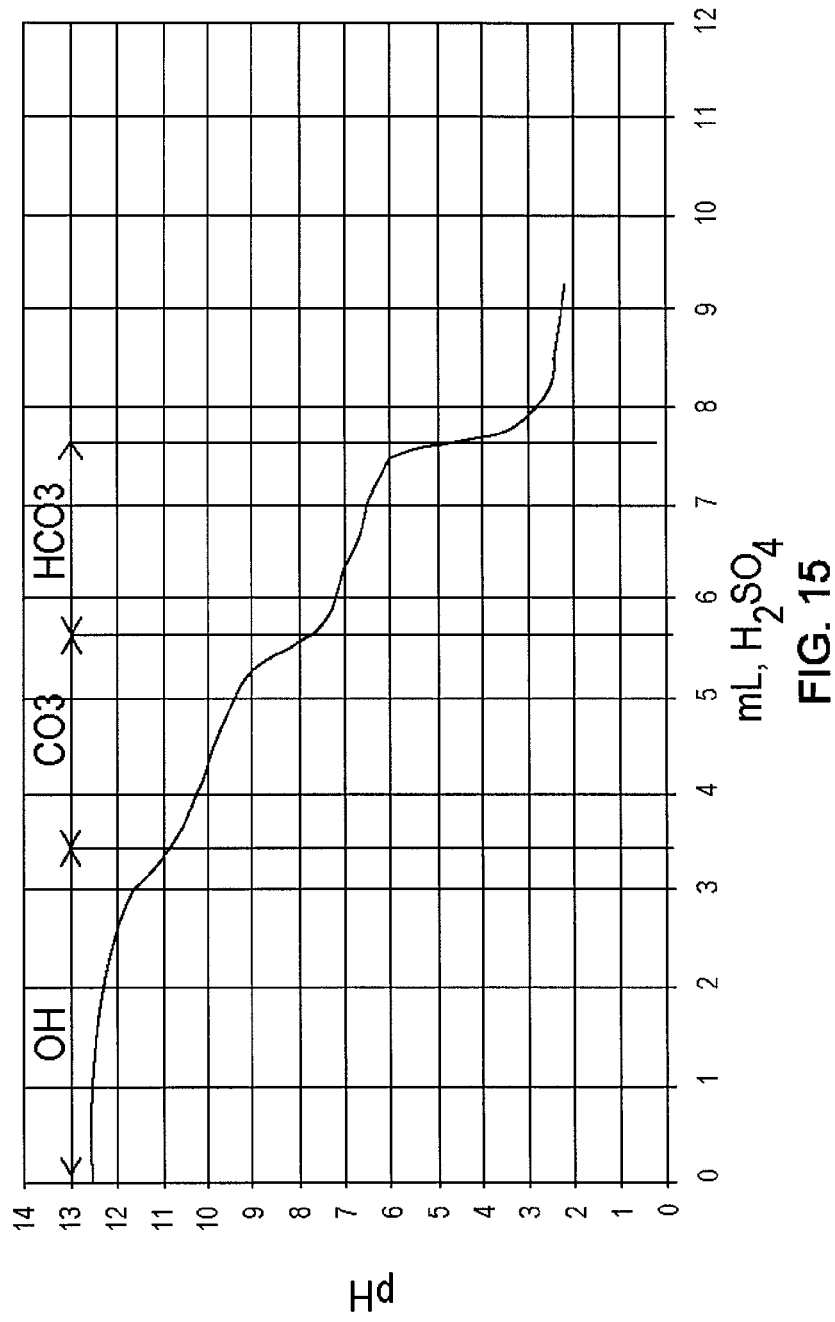

FIG. 15 is an example of the titration data of the filtrate from a leaching test example.

Figure 16:
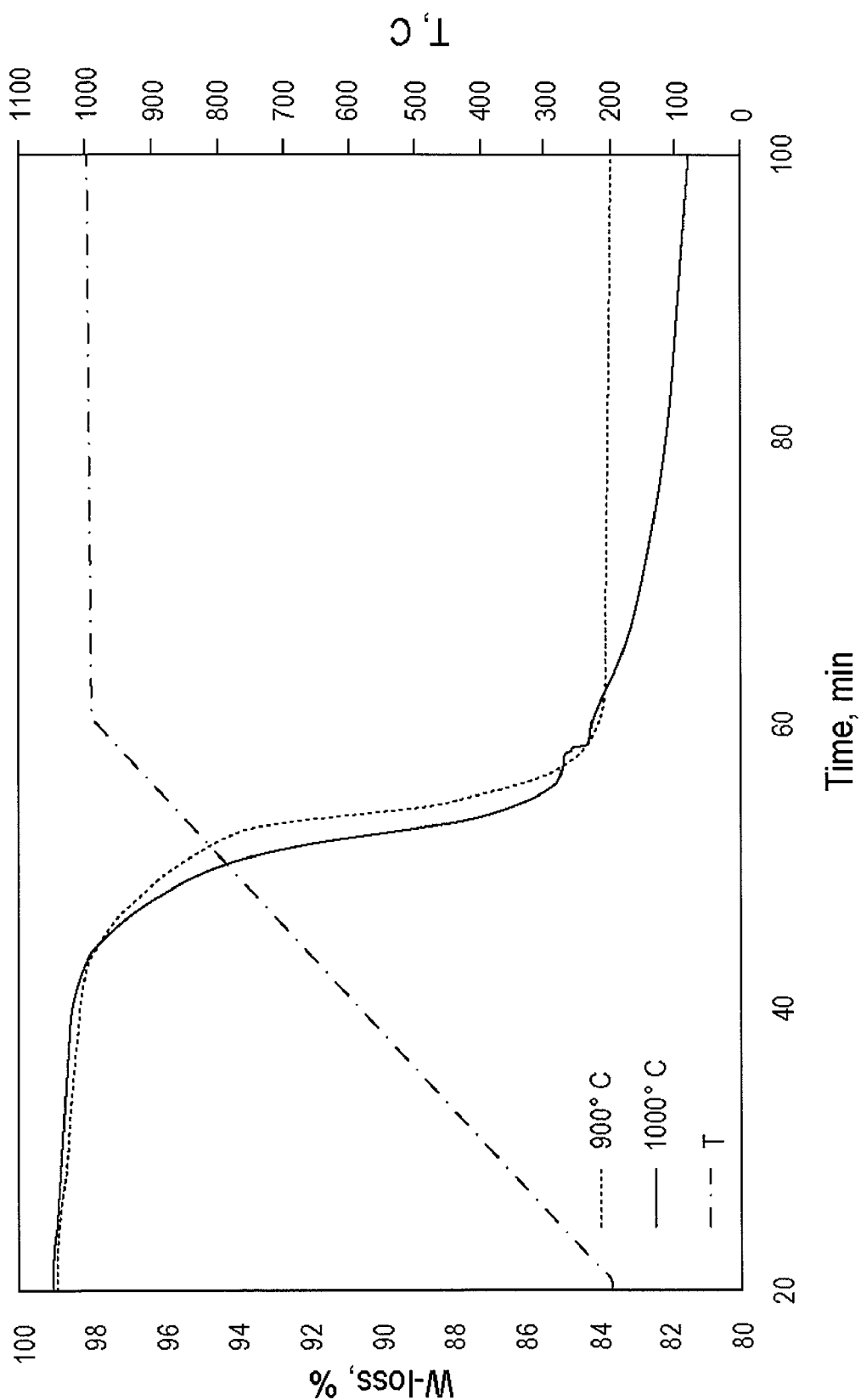

FIG. 16 is an example of the effect of temperature on the decarbonization reaction [4].

FIG. 17 is an example of the effect of steam at 900° C. (a) and 1000° C. (b) on the decarbonization reaction [4].

FIG. 18 is an example of the effect of $CO_2$ on decarbonization reaction [4] at (a) 900° C. and (b) 1000° C.

Figure 19:
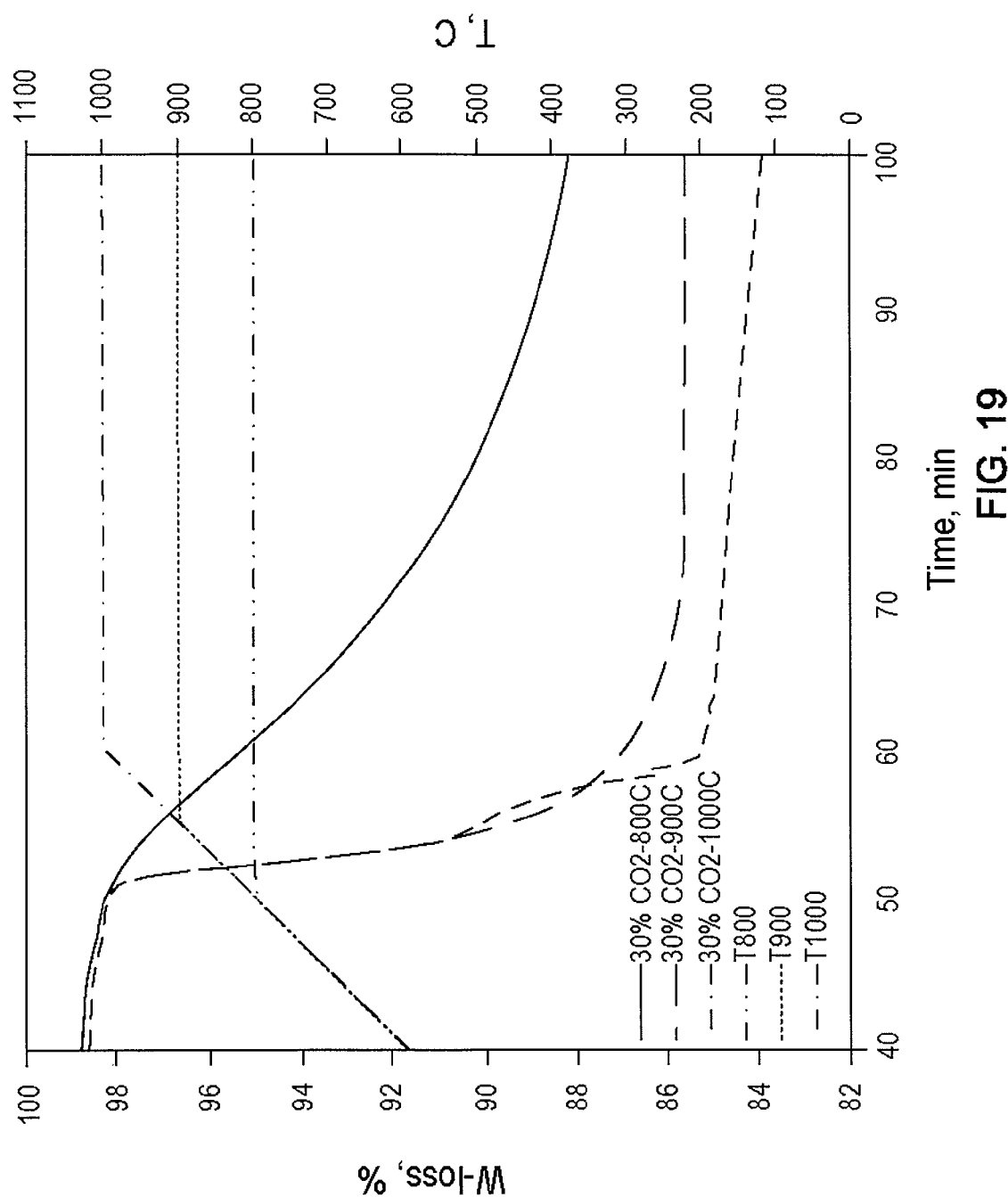

FIG. 19 is an example of the effect of temperature on decarbonization in 30% $CO_2$-70% $N_2$.

Figure 20:
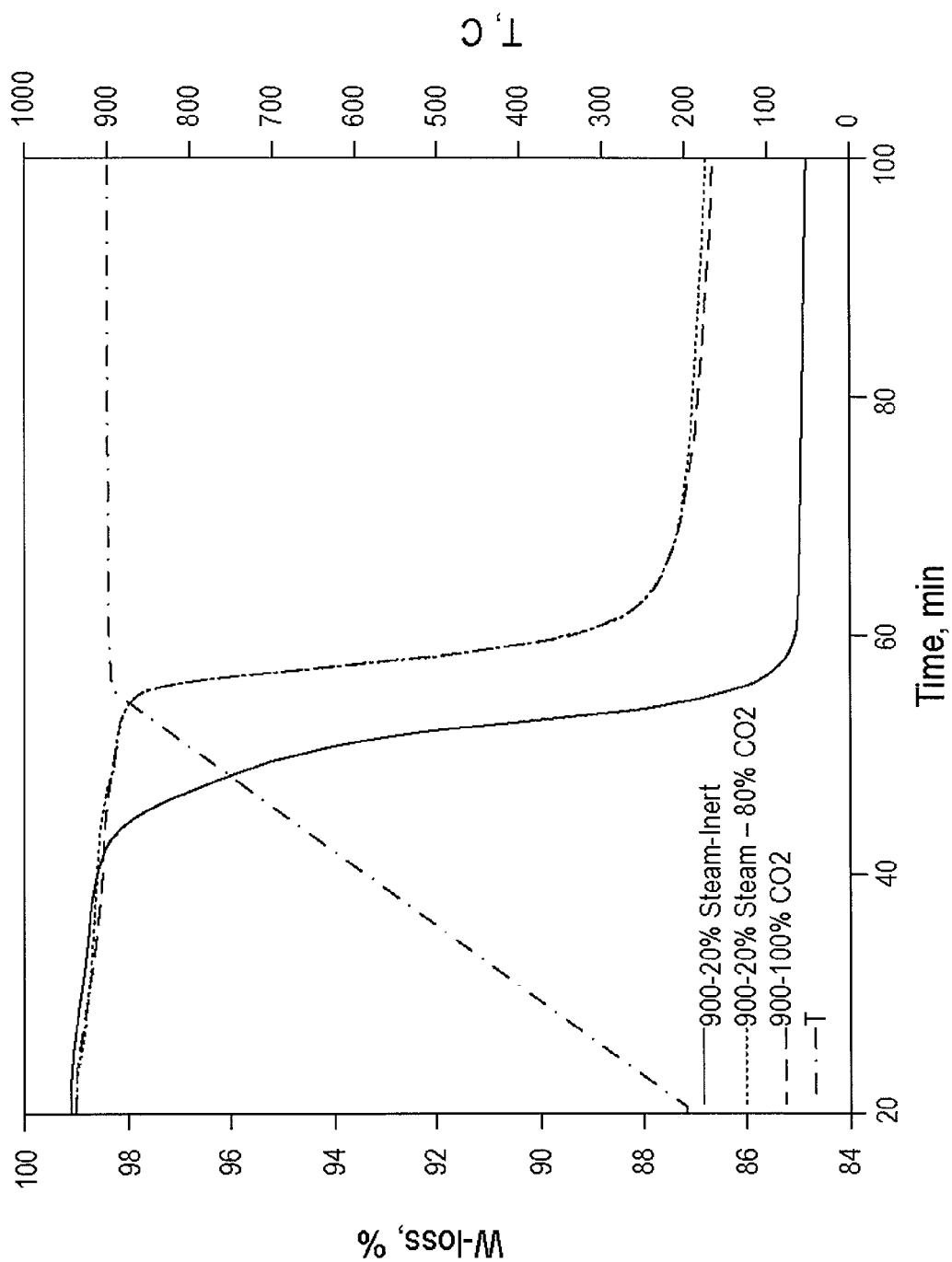

FIG. 20 is an example of the effect of steam and $CO_2$ at 900° C.

DETAILED DESCRIPTION

A number of embodiments are described. The embodiments are selected examples and are non-limiting. A person of skill in the art will understand from reading the present specification that various modifications may be made to the described embodiments and that other embodiments exist that are within the spirit and scope of the invention.

Process Description

Figure 1:
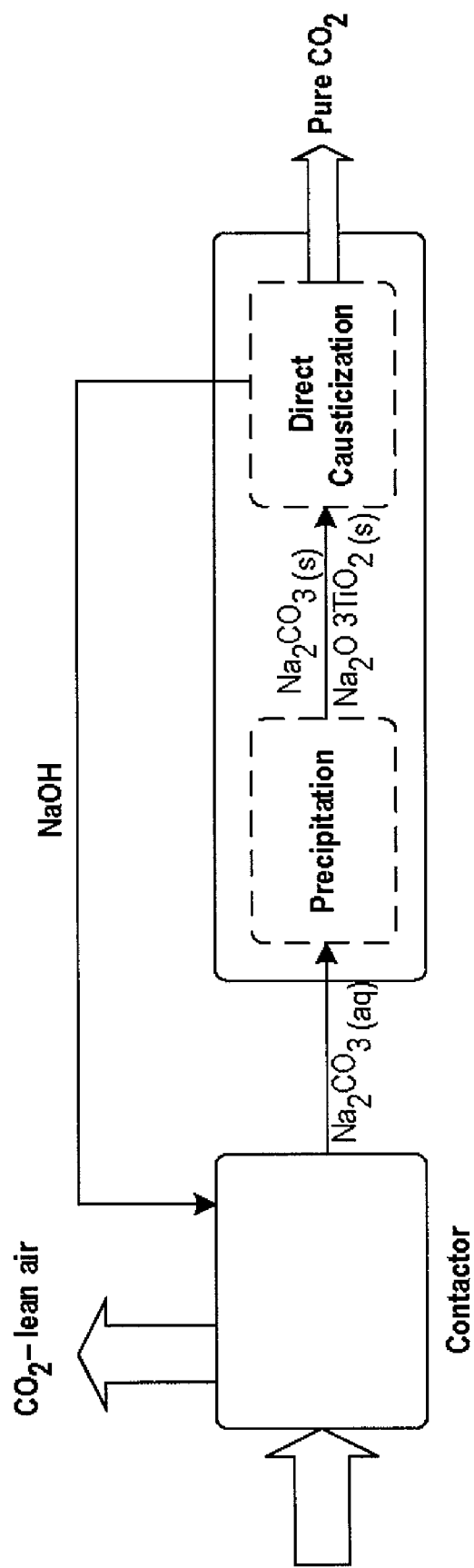
FIG. 1: Block diagram of one embodiment for chemical recovery using titanates in air capture.

FIG. 1 illustrates a simplified schematic sketch of a proposed process for the regeneration step in capturing $CO_2$ from air which is viewed as a two step process requiring a precipitation and a decarbonization step. In some embodiments, precipitation may broadly refer to, for example, separating and crystallizing. Non-limiting flow sheets detailing some embodiments of the process are illustrated in FIGS. 2 and 3. Referring to FIG. 1, an embodiment of a method of carbon dioxide capture is disclosed. In a step (a), carried out, for example, in a contactor, gas containing carbon dioxide is scrubbed with an aqueous solution of sodium hydroxide to react the carbon dioxide to form a first aqueous solution containing sodium carbonate. Scrubbing may refer to, for example, any method of removing $CO_2$ from gas. Referring to FIG. 1, in a step (b), anhydrous sodium carbonate can be separated from the first aqueous solution. As illustrated, separating anhydrous sodium carbonate from the first aqueous solution may involve more than one step, and may involve more than one solution. Referring to FIG. 2, one example of such separation is illustrated as being carried out in two crystallizers. Referring to FIG. 1, in a step (c), the anhydrous sodium carbonate is treated by causticization to generate carbon dioxide and sodium hydroxide. Referring to FIG. 2, one example of causticization is illustrated as being carried out in a fluidized bed reactor. Referring to FIG. 1, in some embodiments, causticization comprises at least one of auto-causticization and direct causticization. In some embodiments, step (c) may further comprise steps (c1) and (c2). Referring to FIG. 2, for example, in a step (c1) the anhydrous sodium carbonate can be reacted with sodium tri-titanate to produce carbon dioxide gas and sodium penta-titanate, in the fluidized bed reactor. In a step (c2), for example, sodium hydroxide and sodium tri-titanate can be regenerated from the sodium penta-titanate, in, for example, a leaching unit.

In some embodiments, referring to FIG. 3, methods of making anhydrous sodium carbonate from a first aqueous solution containing sodium carbonate can comprise the steps of (x) and (y). The first aqueous solution may be obtained from, for example, a carbon dioxide capture system as illustrated in FIGS. 2 and 3. In some embodiments, step (b) may further comprise steps (x) and (y). In step (x), a hydrate of sodium carbonate can be separated from the first aqueous solution. In some embodiments, the first aqueous solution contains sodium hydroxide. In step (y) the hydrate of sodium carbonate can be dissolved in a second aqueous solution and the second aqueous solution can be heated to a temperature at or above the transition temperature of monohydrate sodium carbonate and anhydrous sodium carbonate precipitation to produce the anhydrous sodium carbonate. The second aqueous solution may initially be, for example, pure or trace contaminated water, prior to any dissolution of sodium carbonate therein, or the second aqueous solution may have other species present therein. The dissolving and heating of step (y) may occur in any order, for example heating and then dissolving, or dissolving and then heating. Steps (x) and (y) can be carried out in the crystallizers, for example. The concentration of sodium carbonate in the first aqueous solution may be lower than the concentration of sodium carbonate in the second aqueous solution. An example of this is illustrated in the schematic in FIG. 2, as the first aqueous solution has a concentration of 0.37 M $Na_2CO_3$, and the second aqueous solution has a concentration of 30%, or 2.8 M, sodium carbonate. In some embodiments, the anhydrous sodium carbonate produced in step (y) is treated by causticization to generate carbon dioxide and sodium hydroxide. Causticization may comprise at least one of auto-causticization and direct causticization.

Referring to FIG. 3, in some embodiments, the precipitation unit may be a two-stage crystallization/precipitation unit for precipitating anhydrous sodium carbonate from a concentrated alkaline aqueous solution (e.g., the solution of steps (x) and (y)). In the first crystallization stage, sodium carbonate decahydrate, for example, may be crystallized from a concentrated alkaline aqueous solution, and in the second stage, anhydrous sodium carbonate can be precipitated from a saturated sodium carbonate aqueous solution simultaneously as the sodium penta-titanate is hydrolyzed at elevated temperature. In other embodiments, the hydrate may be a monohydrate, heptahydrate, or decahydrate, or any mixtures thereof, for example. In some embodiments, the hydrolysis of sodium penta-titanate can include the addition of aqueous sodium hydroxide to the solution which lowers the solubility of sodium carbonate forcing the precipitation of sodium carbonate, and will be explained in greater detail below. The solid anhydrous sodium carbonate may then be, for example, causticized using direct causticization with titanate in the causticization unit where $CO_2$ is liberated from sodium carbonate and sodium hydroxide is regenerated and recycled to the contactor.

In some embodiments, at temperatures above about 100° C., the precipitated sodium carbonate will be in the anhydrous form needed for the reaction with tri-titanate, thus reducing the process energy requirements. The sodium hydroxide can be regenerated by the hydrolysis of sodium penta-titanate and recycled to the contactor as a subsequent first aqueous solution, and the solid anhydrous sodium carbonate may then be causticized using direct causticization with titanate, in the causticization unit where $CO_2$ is liberated from sodium carbonate.

Separation of Sodium Carbonate from Concentrated Alkaline Reservoir Solution

If sodium carbonate is going to be converted to sodium hydroxide via a direct causticization process, it may first be separated from concentrated alkaline solution in a relatively pure solid stream. This is important because (1) the causticization reaction with titanium dioxide or recycled sodium tri-titanate is a solid state or solid-smelt state reaction and the presence of aqueous phase along with sodium carbonate can dramatically increase the energy demand due to evaporation, (2) the presence of sodium hydroxide along with sodium carbonate in the causticization reactor can cause the formation of sticky particles and the vaporization of sodium metal which can lead to corrosion, (3) the presence of sodium hydroxide can decrease the melting point of sodium carbonate.

Before describing the process design, a review of the solubility of sodium carbonate in water and in hydroxide is provided and an examination of the influence of temperature and hydroxide ion concentration on solubility is provided.

Solubility Data for Sodium Carbonate—Water System

Figure 4:
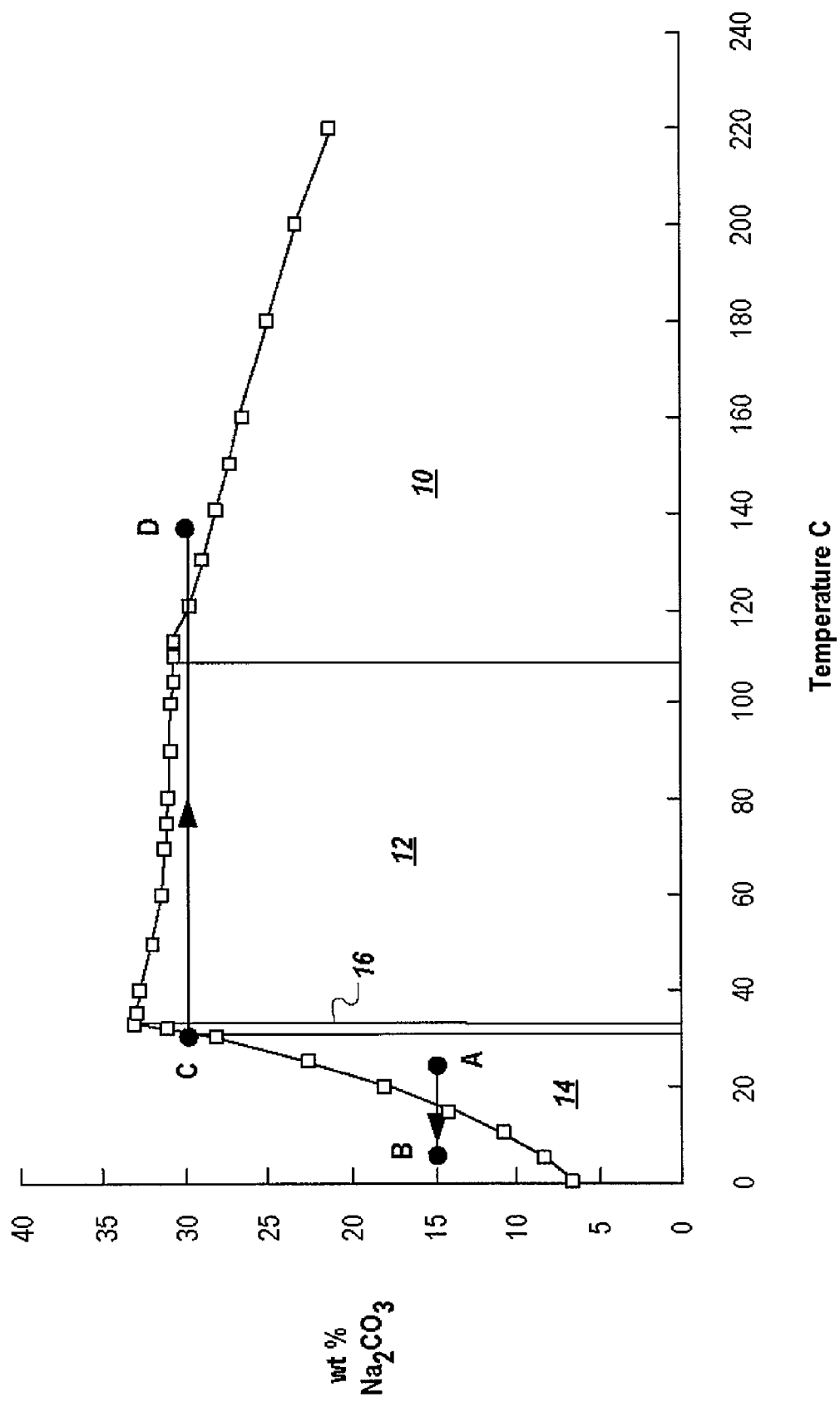
FIG. 4: Solubility of sodium carbonate in water. The four labeled dots provide a schematic indication of the process for separating anhydrous $Na_2CO_3$ according to an embodiment of a method disclosed herein. A solution of $Na_2CO_3$ at point 'A', is cooled to point 'B' precipitating decahydrate ($Na_2CO_3 \cdot 10H_2O$). The decahydrate may be then be dissolved at C and heated to D to precipitate anhydrous sodium carbonate.

The solubility data, solid phases and transition temperatures for sodium carbonate-water systems have been reviewed and collated. Sodium carbonate, whose anhydrous and monohydrated forms dissolve exothermally, shows a complex pattern of solubility. In the region in which the equilibrium salt phase is anhydrous, indicated by region 10, its solubility decreases with increasing temperature, see FIG. 4. Referring to FIG. 4, regions 12, 14, and 16 refer to regions of monohydrate, decahydrate, and heptahydrate equilibrium salt phase, respectively. Transition points in the sodium carbonate-water system are shown below in Table 1, in which the temperature at the transition point between sodium carbonate mono-hydrate and sodium anhydrous carbonate is 109° C. with no secondary solute present. The sodium carbonate in the second aqueous solution may have a concentration that is at or above the saturation concentration of sodium carbonate at the temperature the second aqueous solution is heated to. The saturation concentration is understood to be a function of, for example, temperature, pressure, and secondary solute concentration (see FIG. 5). As illustrated in FIG. 4, the concentration of sodium carbonate in the second aqueous solution may be equal to or less than 31% wt.

TABLE 1

Temperature at transition points in $Na_2CO_3$—$H_2O$ system

| Phases | Temp, ° C. |
|---|---|
| $Na_2CO_3 \cdot 10H_2O$-ice | −2.1 |
| $Na_2CO_3 \cdot 10H_2O$-$Na_2CO_3 \cdot 7H_2O$ | 32.00 |
| $Na_2CO_3 \cdot 10H_2O$-$Na_2CO_3 \cdot H_2O$ | 32.96 |
| $Na_2CO_3 \cdot 7H_2O$-$Na_2CO_3 \cdot H_2O$ | 35.37 |
| Boiling point | 104.8 |
| $Na_2CO_3 \cdot H_2O$-$Na_2CO_3$ | 109 |

Sodium carbonate can be crystallized as various hydrates. Based on solubility data for sodium carbonate-water system, at 30% wt sodium carbonate concentration, the solution becomes super-saturated at $T \geqq 118°$ C. and the formation of sodium anhydrous carbonate crystals, known as primary nucleation, can start at this point. The transition temperature between sodium carbonate monohydrate and anhydrous sodium carbonate is higher than the boiling point of a saturated sodium carbonate solution (about 30% wt, or 2.8 M for example) (see FIG. 4 and Table 1).

Different methods may be applied to produce anhydrous sodium carbonate from a pure aqueous solution. Operating under pressurized condition is one way to raise the boiling temperature (which may be 105.7° C.) above the transition temperature (which may be 109° C. when no secondary solute is present). The other way, mostly presented in the literature, is to crystallize sodium carbonate at lower temperatures either as sodium carbonate decahydrate ($Na_2CO_3.10H_2O$) or monohydrate ($Na_2CO_3.H_2O$), and then calcine the hydrates. The hydrates are calcined at 150° C to 200° C. to obtain the anhydrous form. The thermal dehydration of sodium carbonate hydrates is, however, considerably endothermic, and the values of 52.67 and 58.77 kJ/mol $H_2O$ have been cited for decahydrate and monohydrate, respectively. These values are appreciably greater than the heat of vaporization of liquid water at 298 K, which amounts for 44 kJ/mol $H_2O$. An alternative crystallization method may be used, in which a suitable anti-solvent is used to decrease the solubility of the salt and also to lower the water activity. This means that the transition temperature is lowered and an anhydrate can be produced directly at lower temperatures, even below the boiling point of the solution. Addition of ethylene glycol by 25% wt, for example, can increase the boiling point of the solution from 105.7° C. to 106.8° C. and lower the transition point from 109° C. to 105.7° C.

Solubility Data for Sodium Carbonate—Sodium Hydroxide System

Figure 5:
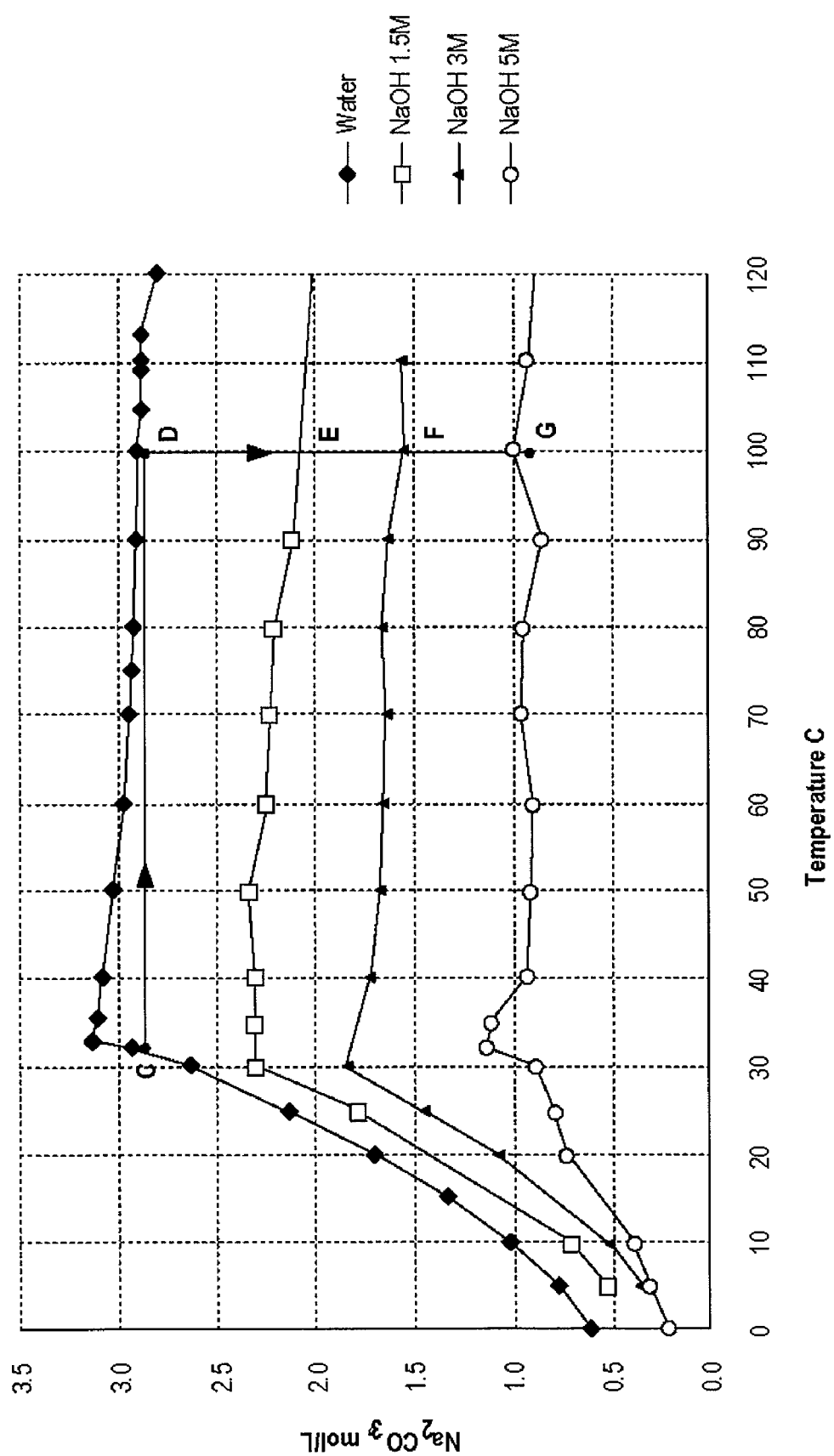
FIG. 5: Solubility of sodium carbonate in water and 1.5, 3 and 5M NaOH solution. The separated crystals of sodium carbonate decahydrate are dissolved in water at ~30° C. to produce a saturated solution indicated by the point 'C'. The solution is heated to about 100° C. (point 'D') at which due to hydrolysis of added sodium penta-titanate, NaOH is leached out; this would in turn cause the sodium carbonate to precipitate as anhydrous sodium carbonate. Depending on the concentration of leached NaOH, the solubility of sodium carbonate would drop to points E, F or G.

The ternary system of $Na_2CO_3$—$NaOH$—$H_2O$ has been studied, and the solubility of carbonate salts, in general, was found to drop in the presence of secondary solutes, such as hydroxide ions. FIG. 5 illustrates a summary of the data on solubility of sodium carbonate at different temperatures and concentrations of an NaOH solution, 5, 10 and 17% corresponding to 1.5, 3 and 5 M NaOH.

In some embodiments, step (y) further comprises introducing at least one secondary solute to the second aqueous solution to lower the solubility of the anhydrous sodium carbonate. In further embodiments, the at least one secondary solute comprises sodium hydroxide. As it is shown in FIG. 5, in general, the solubility curve for sodium carbonate in the presence of sodium hydroxide in the solution follows the same pattern as the solubility curve for $Na_2CO_3$-water system and that at the higher concentration of NaOH, based on the solubility product rule, the solubility of sodium carbonate can drop significantly. Referring to FIG. 3, the sodium hydroxide may be introduced to the second aqueous solution with the addition of sodium penta-titanate into the second aqueous solution. Sodium penta-titanate added into the second crystallizer, as shown in FIG. 3, can hydrolyze into sodium hydroxide and sodium tri-titanate. The increase in concentration of sodium hydroxide thus introduced can then lower the solubility of sodium carbonate according to the graph of FIG. 5, aiding in the separation of anhydrous sodium carbonate. In the embodiment illustrated, step (y) may further comprise producing the anhydrous sodium carbonate and sodium tri-titanate together. This may be accomplished by removing a solid mass of sodium tri-titanate and anhydrous sodium carbonate together, for example. In further embodiments, the produced sodium tri-titanate and anhydrous sodium carbonate may be produced in stoichiometric ratios for efficient completion of the causticization reaction.

Figure 6:
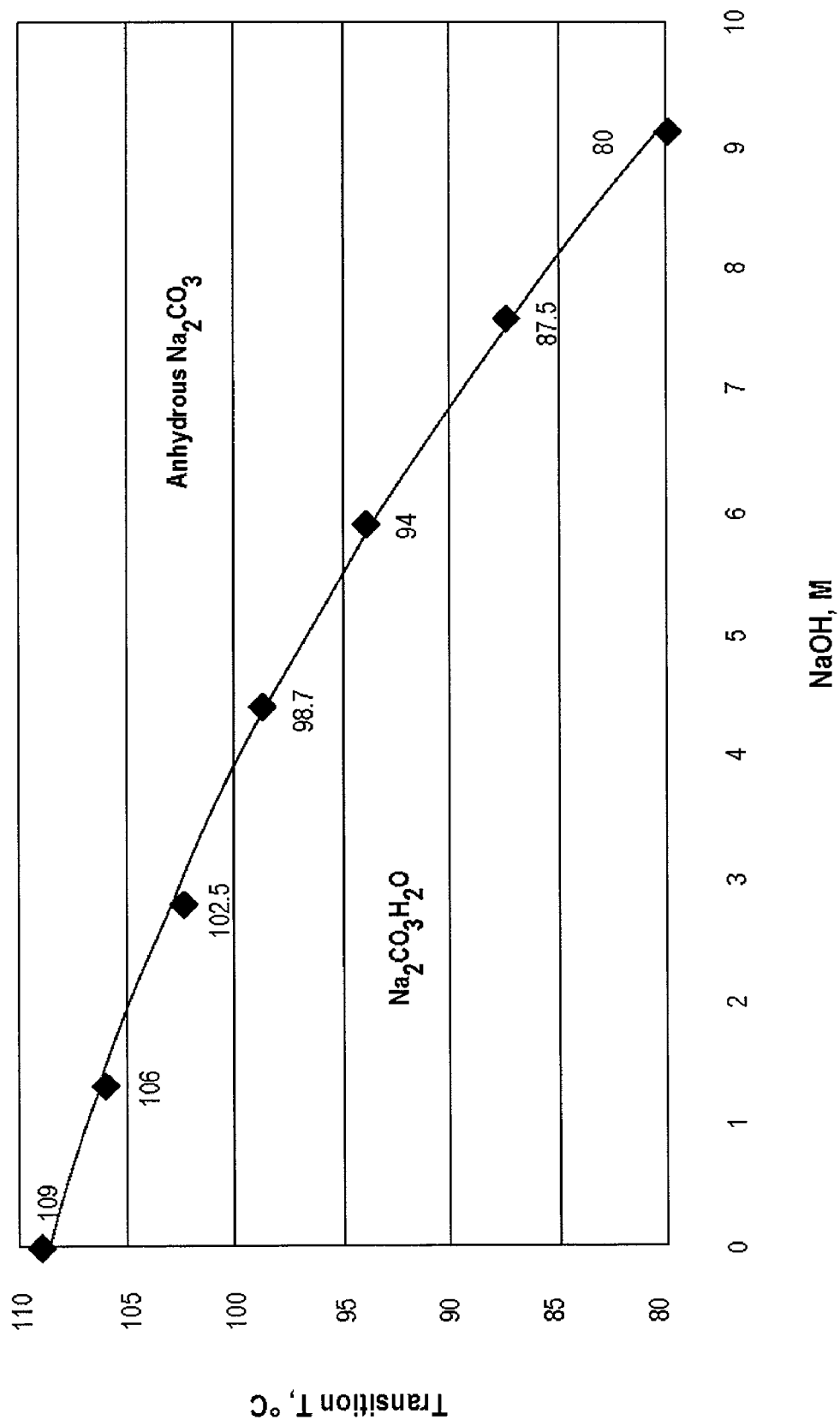
FIG. 6: Dependency of transition T between monohydrate and anhydrous on NaOH concentration.

Referring to FIG. 6, the transition temperature of sodium carbonate monohydrate and anhydrous sodium carbonate can be influenced by the concentration of a secondary solute, such as sodium hydroxide. Addition of other soluble substances, e.g. sodium hydroxide, to a saturated aqueous solution of sodium carbonate can cause a reduction in its vapor pressure which results in an elevation of its normal boiling point and a reduction of the transition temperature from sodium carbonate monohydrate to anhydrous sodium carbonate.

Process Design for the Separation of Anhydrous Sodium Carbonate from Alkaline Solution Earlier studies on obtaining anhydrous sodium carbonate deal mostly with the separation of anhydrous sodium carbonate from crude sodium sesquicarbonate or brine solution. The precipitation of anhydrous sodium carbonate from an aqueous solution of sodium carbonate and sodium hydroxide has not been addressed in the literature. In this document, therefore, disclosed is a method to precipitate 95% pure anhydrous sodium carbonate from a concentrated alkaline solution which may be used as the absorbent to capture $CO_2$ from ambient air.

In the disclosed process, sodium carbonate may be precipitated as sodium carbonate decahydrate, $Na_2CO_3 \cdot 10H_2O$, from a, for example, saturated solution of $Na_2CO_3$—NaOH (in the reservoir), e.g. 0.7M $Na_2CO_3$ in 5M NaOH at 20° C., by means of a temperature swing, e.g. from 25° C. to 10° C. The concentration of dissolved $Na_2CO_3$ in the reservoir is a critical operational parameter; Table 2 illustrates a range of carbonate concentrations in the solution as a function of temperature. In some embodiments, step (x) further comprises adding at least one secondary solute, for example sodium hydroxide, to the first aqueous solution containing sodium carbonate in order to lower the solubility of the hydrate of sodium carbonate. In this document, secondary solute may be any solvent or solid, for example sodium hydroxide, that lowers the solubility of sodium carbonate in water. As illustrated, in some embodiments, step (x) further comprises cooling the first aqueous solution to separate the hydrate of sodium carbonate from the first aqueous solution, illustrated by, for example, dots A to B in FIG. 4. Referring to FIG. 4, running the reservoir with carbonate close to saturation minimizes the energy required for the temperature swing, but if the concentration is too close to saturation there may be carbonate precipitation in the monohydrate or heptahydrate regions, for example. In further embodiments, step (x) further comprises cooling the first aqueous solution containing sodium carbonate to a temperature above 0° C. In some embodiments, the hydrate of sodium carbonate is dissolved in the second aqueous solution in step (y) at elevated temperature. The elevated temperature may be, for example, between 20 and 31° C. as illustrated in FIG. 4. The four labeled dots in FIG. 4 illustrate a schematic indication of sodium carbonate decahydrate precipitation. Although the separation process is illustrated only for the $Na_2CO_3$-water system, the separation process for $Na_2CO_3$ from $Na_2CO_3$—NaOH—$H_2O$ would follow the same concept.

While crystallization of sodium carbonate decahydrate can be initiated by imposing a sufficiently large temperature swing, a practical large-scale process can require that crystals be grown to a large enough size that they can be cost effectively removed from solution with a minimum of solution carry-over. Different crystallizer designs which use a cooling process are available. For example, a draft tube baffle (DTB) crystallizer from Swenson Crystallization Equipment can be useful for crystallizing sodium carbonate decahydrate. This crystallizer includes a baffle section surrounding a suspended magma of growing crystals from which a stream of mother liquor is removed containing excess fine crystals. These fines can be destroyed by adding heat (as in an evaporative crystallizer) or by adding water or unsaturated feed solution. The magma is suspended by means of a large, slow-moving propeller circulator which fluidizes the suspension and maintains relatively uniform crystal growth zone conditions. Another design may be a pellet reactor type crystallizer which is called a "Crystalactor", and may be made by DHV Water AB, for example. A pellet reactor type crystallizer may also be a fluidized pellet reactor. The crystalactor is filled with suitable seeding material and can be used to speed up the crystallization of sodium carbonate decahydrate. The crystalactor has been used for metal and anion recovery from waste water. This type of crystallizer has also been studied for precipitation of other metal-carbonates. The fluidized bed provides a very large crystallization surface and in a fast controlled reaction almost all the anion crystallizes directly from the solution into the crystal lattice. Therefore, pure, almost alkaline-free salt with a moisture content of only 5-10% may be produced after atmospheric drying.

After separation of pure $Na_2CO_3 \cdot 10H_2O$, the crystals may be dissolved in warm water (at temperatures above 30° C., for example) to a total concentration of, for example, 2.8M (30% wt) at a pH level of about 12. It should be mentioned that, in some embodiments, the pH level in the process units is high enough to reduce co-crystallization of any sodium bicarbonate crystals during the process (i.e. sodium bicarbonate precipitates at pH between 6 and 9, while the pH level for the process is always kept above 12). Therefore, in some embodiments, the pH of the first aqueous solution is high enough in step (y) to reduce co-crystallization of sodium bicarbonate. In some embodiments, the pH of the first aqueous solution is high enough in step (b) to reduce co-crystallization of sodium bicarbonate. In order to precipitate anhydrous sodium carbonate from this aqueous solution, the solution may be heated to temperatures above 118° C. However, as stated earlier, the boiling point of a 30% wt sodium carbonate solution is 105.7° C. To avoid boiling, the system, for example the container containing the solution, might be pressurized. In some

TABLE 2

The changes in concentrations of carbonate when NaOH is present at different concentrations.

| Ambient T (° C.) | NaOH concentration in reservoir (mol/L) | Maximum Carbonate Concentration (mol/L) | T swing (ΔT, ° C.) | Carbonate concentration out (mol/L) | Precipitated carbonate (ΔC) |
|---|---|---|---|---|---|
| 30 | 5 | 0.9 | 20 | 0.42 | 0.48 |
| 25 | 5 | 0.85 | 15 | 0.42 | 0.43 |
| 20 | 3 | 1 | | 0.55 | 0.45 |
| | 5 | 0.75 | 10 | 0.42 | 0.33 |
| | 3 | 0.75 | | 0.55 | 0.2 |
| 15 | 5 | 0.55 | 5 | 0.42 | 0.13 | embodiments, the anhydrous sodium carbonate is produced in step (y) at elevated pressure. Pressurized operation can be economically feasible because pressures as low as 1.6 bar may suffice to prevent or reduce evaporation. For example, at 118° C., the minimum pressure to prevent evaporation of water may be 1.8 bar. The 1.8 bar pressure may be the upper limit for $Na_2CO_3$—$H_2O$ system, because the boiling point of water in general increases by adding a salt to the system. The boiling point of $Na_2CO_3$—$H_2O$ solution would, therefore, be higher than the boiling point of water. Crystallization of anhydrous sodium carbonate can also be accomplished by removing water using an evaporative process or reverse osmosis. Alternatively, it might be achieved by use of anti-solvents, however, the addition of anti-solvents is probably not applicable to an air capture process because of hazardous organic vapor emissions into air through the introduction of a few percent of organic anti-solvents into the alkaline solution which is sprayed in the contactor.

In some embodiments, an alternative process can include introduction of a secondary solute, such as sodium hydroxide, into the solution when the solution is heated to a temperature close to but below the boiling point. Referring to FIG. 5, this could drop the solubility and anhydrous $Na_2CO_3$ could precipitate, e.g. dropping the solubility from point D to E in FIG. 5. In one embodiment, 6-10% wt NaOH is added. FIG. 5 illustrates the solubility of sodium carbonate at concentrations of 0, 1.5, 3, and 5 M NaOH. Points D-G illustrate the difference in solubility as the solution increases from 0 to 5M NaOH at temperatures of about 100° C. In some embodiments, the secondary solute addition may increase the boiling point of water, in addition to, or instead of, reducing the saturation concentration of sodium carbonate. Referring to FIG. 6, the transition temperature between sodium carbonate monohydrate and anhydrous sodium carbonate can shift from 109° C. in $Na_2CO_3$-water solution to about 97° C. in a $Na_2CO_3$—NaOH-water system with a final concentration of about 5M of NaOH. The phase boundary of sodium carbonate can, therefore, shift to permit the crystallization to be carried out at atmospheric pressure while still growing crystals of anhydrous sodium carbonate.

In some embodiments, a high concentration of NaOH in a saturated solution of sodium carbonate at elevated temperature is provided and disclosed as a process in which anhydrous sodium carbonate can be precipitated simultaneously as the sodium penta-titanate from the decarbonization unit is hydrolyzed to leach sodium hydroxide, see reaction [5]. The leaching of sodium hydroxide from sodium penta-titanate is an endothermic reaction, $\Delta H=15.2$ kJ/mol $CO_2$, and experimental data at temperatures of 70 and 100° C. has shown that the leaching rate at about 100° C. can be high enough to produce a maximum 5M aqueous solution of sodium hydroxide.

In some embodiments, the proposed process can work as follows: penta-titanate can be added to the ~2.8M saturated sodium carbonate solution at temperatures of ~100° C. The sodium penta-titanate can hydrolyze releasing NaOH which drives the sodium carbonate out of solution. The leaching of sodium hydroxide can shift the solubility curve of sodium carbonate as well as the transition temperature of sodium carbonate monohydrate and anhydrous sodium carbonate precipitation. A preliminary laboratory study for the simultaneous reactions was done successfully and is disclosed below. More specifically, sodium hydroxide was successfully leached out from sodium penta-titanate, and the concentration controlled so that a 3 and 5M sodium hydroxide solution was produced and the anhydrous sodium carbonate was precipitated at a temperature of 100° C. The more detailed leaching kinetics study and the influence of dissolved sodium carbonate are being investigated.

Decarbonation of Sodium Carbonate via Direct Causticization

Thermodynamics of the titanate reaction has been widely studied, beginning as early as 1979 by Kiiskila. The lower limit for reaction temperature is 840° C. in order to achieve sufficiently high reaction rates due to reaction [5]. This reaction is endothermic, meaning that the reaction rate is higher at higher temperature. At temperatures above the melting point of sodium carbonate, for example, the enthalpy of reaction [5] was reported to be 62 kJ/mol $CO_2$, whereas at temperatures below the melting point and above 840° C., the enthalpy of reaction [5] is 90 kJ/mol $CO_2$. The enthalpy of fusion for $Na_2CO_3$ is 25.7 kJ/mol, which is approximately equal to the difference between the enthalpy of reaction [5] above and below the melting point. So the net enthalpy of reaction is about the same in either case. In some embodiments, step (c1) is carried out at temperatures at or above the melting point of anhydrous sodium carbonate.

After a thorough thermodynamical analysis, it may be found that although the reaction can be carried out in solid state, at temperatures slightly above the melting point (~860° C.), the total energy requirement for heating the reactant and the reaction is 3% less than for temperatures below the melting point. Moreover, at temperatures slightly above the melting point, the total energy that can be recovered from cooling of the products is ~3% more than for the temperatures below melting point. This would, in turn, lead to 6% more energy efficiency when causticization is carried out at temperatures slightly above the melting point. The reaction rate is also higher at temperatures slightly above the melting point, which is of great importance for the residence time in the fluidized-bed reactor.

The parameters influencing the kinetics of reaction [5] are thought to be the particle size of both sodium carbonate and titanium dioxide and the molar ratio of titanium dioxide and sodium carbonate ($TiO_2/Na_2CO_3$). It has been found that all of the sodium carbonate is converted below its melting point (858° C.) for particle sizes <25 μm and $TiO_2/Na_2CO_3=1.25$, indicating that the reaction can be carried out successfully in the solid state. However, when larger particle sizes, e.g. 63 μm, or smaller molar ratios, e.g. $TiO_2/Na_2CO_3=1$, were used, the causticization reaction was slower than the previous cases at temperatures below the sodium carbonate melting point.

Besides the parameters discussed above, the partial pressure of $CO_2$ in the reaction atmosphere seems to influence the reaction kinetics as well. The mechanism is not yet clearly understood. There may be a retarding effect of $CO_2$ partial pressure on reaction rate. A thorough investigation of the mechanism for the influence of $CO_2$ partial pressure on titanate reaction may be required, in order to separate a $CO_2$ stream at partial pressures of about 1 bar from the fluidized bed reactor. This would simplify the compression of separated $CO_2$ to higher pressures of about 100 bar.

In some embodiments, the method may further comprise steps (e) and (f). In step (e), anhydrous sodium carbonate is separated from a subsequent first aqueous solution containing sodium carbonate. The subsequent aqueous solution may be derived from the initial aqueous solution. Referring to FIGS. 2 and 3, this is illustrated in the cycle of the process. In step (f), the anhydrous sodium carbonate separated in step (e) is treated by causticization to generate carbon dioxide and sodium hydroxide. The method may also further comprise a step (d) in which a subsequent gas containing carbon dioxide is scrubbed with the subsequent aqueous solution of sodium hydroxide to react the carbon dioxide to form the subsequent first aqueous solution containing sodium carbonate. In other embodiments, at least one of the first aqueous solution containing sodium carbonate and the subsequent first aqueous solution containing sodium carbonate may be derived from processes other than gas scrubbing. Referring to FIG. 3, in some embodiments, step (c2) further comprises hydrolyzing the sodium penta-titanate in the separation of anhydrous sodium carbonate in step (e) to regenerate sodium hydroxide and sodium tri-titanate. In further embodiments, such as the one illustrated in FIG. 3, step (e) further comprises producing the anhydrous sodium carbonate and sodium tri-titanate together. In some embodiments, the subsequent aqueous solution of sodium hydroxide can be formed with the sodium hydroxide generated in step (c).

It should be understood that various modifications and variations may be made to the design and process engineering of the system for heating the mixed carbonate/titanate particles disclosed herein. Design alternatives that provide for heat and $CO_2$ recovery are provided.

For example, highly efficient kilns for heating fine particles to temperatures above that required here have been developed for lime ($Ca(OH)_2$) production. The so-called 'D' kilns developed by the Italian lime kiln manufacturer, Cimprogetti, have demonstrated thermal efficiencies above 90% in large-scale applications. The efficiency comes from a counter flow design in which the particles drop through upward flowing gas. In the upper section of the kiln the cool particles are heated by the hot exhaust gases creating a counter current heat exchanger. The calcination reaction proceeds in the middle of the kiln. In the lower section of the kiln the hot particles fall through the incoming air preheating it. Similar kiln designs may be readily adapted to drive the tri-titanate to penta-titanate reaction.

The most conservative and lowest capital cost approach may be to use natural gas fired in air as an indirect heat source. This approach would require minimal adaptation of existing kiln designs, and would presumably carry a small technical risk. The $CO_2$ released from natural gas combustion is only ~⅙ of the $CO_2$ captured from air so one might simply ignore the $CO_2$ produced by combustion. Alternatively, one could use a post combustion process such as amines or chilled ammonia from the exhaust gases.

In some embodiments, a more advanced and perhaps more cost-effective design could use recirculating $CO_2$ into which heat introduced by an "oxyfuel" mixture of oxygen and natural gas or syngas. The design of such systems could be adapted from the many design studies for oxyfuel coal fired power plants which are now being applied at scales of greater than 30 MW. In this case, the primary operating gas would be $CO_2$ at atmospheric pressure or above. The presence of $CO_2$ at atmospheric pressure may, however, cause problems in the titanate kinetics.

In another embodiment, the design could use indirect heat provided by a high temperature gas cooled reactor (HTGR). The second generation of HTGR reactors is currently being developed by several companies including PBMR, ARIVA, and General Atomics. The first commercial scale passively-safe PBRM reactor is expected to start construction in 2009. In these reactors the primary loop helium temperature is ~900° C., and the secondary loop temperature can be above 850° C. It might therefore be practical to drive the titanate reactions using indirect heat provided by the secondary helium loop from an HTGR. In this design essentially the only gas inside the kiln would be $CO_2$ since no water would be introduced by combustion as is the case for oxyfuel.

HTGR's arguably could provide the lowest cost source of carbon neutral high grade heat. If HTGR's are the power source, then the titanate process described here has another advantage, other than energy efficiency, over the calcination process because that titanate process can be operated at temperatures as low as 800° C., whereas the calcination process requires temperatures of ~950° C. (assuming atmospheric pressure $CO_2$). Current HTGR designs cannot practically supply heat at 950° C.

Energy and Exergy Analysis

A thermodynamical evaluation for the conventional causticization and the direct causticization using titanates has been carried out and it was determined that the process with highest potential from both energy and energy equality perspective is the titanate process. It should be mentioned that in these studies solid sodium carbonate was used to perform a fair comparison between the two processes.

In this section, the results of the energy and exergy analysis are shown for the recovery cycle using titanate in which sodium carbonate and lean sodium hydroxide enters the cycle and carbon dioxide and rich sodium hydroxide leaves the cycle as the products. The other substances are recycled between the different units. Note that the starting point for sodium carbonate is the aqueous alkaline solution of $Na_2CO_3$—NaOH from the reservoir solution. The energy analysis for the $CO_2$ absorption section, "contactor", can be found elsewhere. In this document, a total energy requirement of ~130 kJ/mol $CO_2$ is estimated for the recovery cycle using titanate. As shown in Table 3, the highest exergy levels correspond to the decarbonation reaction, heating of reactants and cooling of products.

TABLE 3

Energy and exergy analysis*

| | Enthalpy change ΔH (kJ/mol $CO_2$) | Temperature range T ° C. | Exergy change ΔE (kJ/mol $CO_2$) |
|---|---|---|---|
| Crystallizer 3 | | | |
| Enthalpy of crystallization for $Na_2CO_3 \cdot 10H_2O$ | −68.86 | 10 | −0.3 |
| Combined Crystallizer/Leaching unit | | | |
| Heating $Na_2CO_3 \cdot 10H_2O$ | 8.86 | 10 → 31 | 2 |
| Enthalpy of dissolution for $Na_2CO_3 \cdot 10H_2O$ to 30% wt | 67.9 | 31 | 0.02 |
| Enthalpy of crystallization for $Na_2CO_3$ | 25.1 | 103 | 1 |
| Enthalpy of leaching reaction | 15.2 | 100 | −0.8 |
| Heater 8 | | | |
| Heating $Na_2CO_3$ | 123.4 | 100 → 860 | 93.6 |
| Heating sodium tri-titanate Fluidized bed reactor | 146.9 | 100 → 860 | 100.5 |
| Enthalpy of reaction Cooler 11 | 65 | 860 | −33.8 |
| Cooling $CO_2$ Cooler 13 | −40.7 | 860 → 25 | −22.1 |
| Cooling sodium tri-titanate | −213 | 860 → 100 | −127.7 |
| Total | 130 | — | 11.4 |

*Data for enthalpy and exergy calculation is taken from thermochemical database software HSC Chemistry v.6.12 Outotec Research, www.outotec.com.

Figure 7:
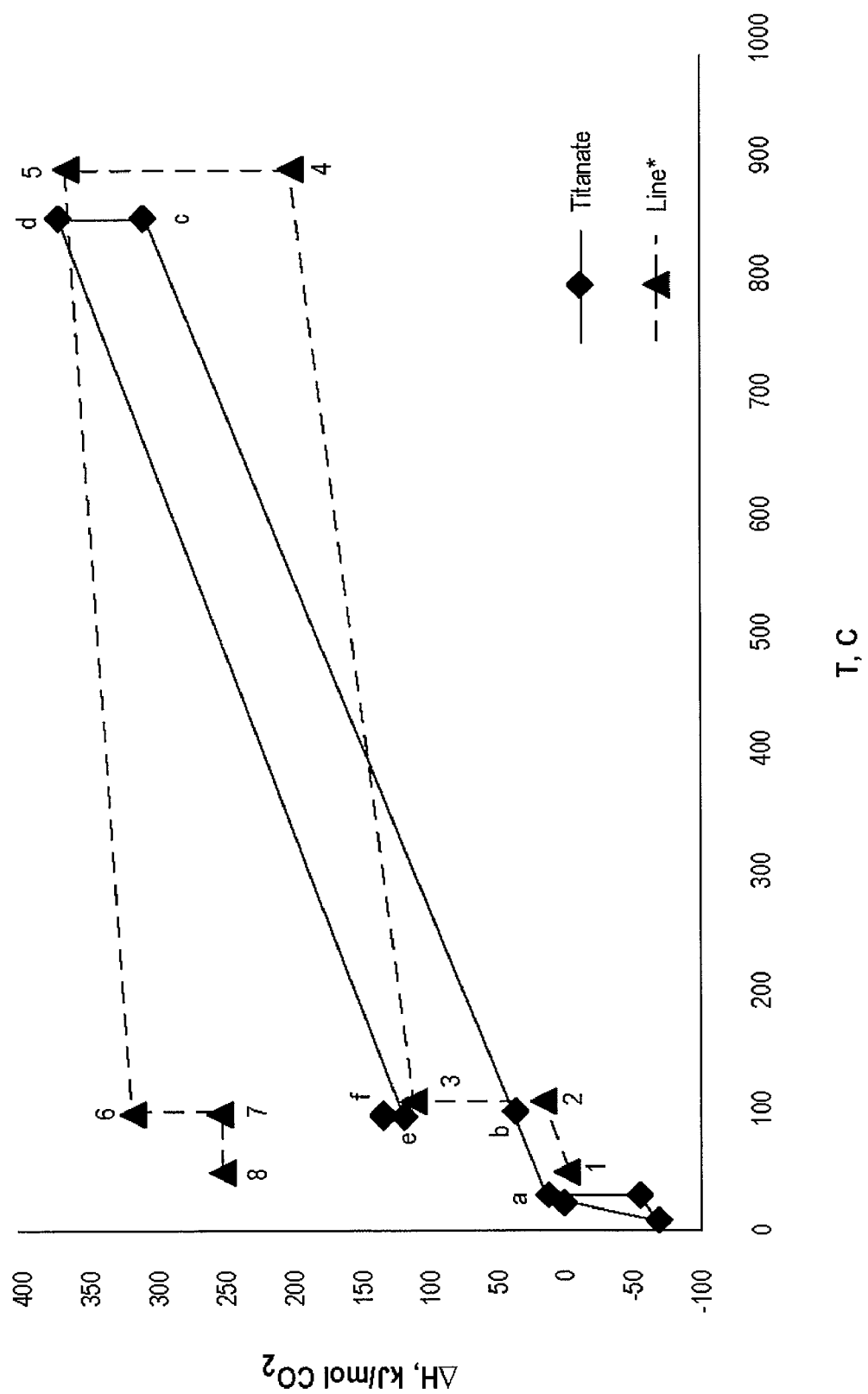
FIG. 7: Enthalpy change for Titanate cycle and Lime ($Ca(OH)_2$) cycle. The moisture content of 30% wt was assumed for $CaCO_3$.

The amount of energy required by the titanate process is compared with the energy requirement in the lime ($Ca(OH)_2$) cycle in FIG. 7 where enthalpy of change, ΔH, for titanate and lime processes at corresponding temperatures is illustrated. In FIG. 7, the lime cycle is presented as a dashed line, labeled by numbers, whereas the titanate cycle is shown in solid lines labeled by letters. As illustrated, the required energy for the titanate process is about half of the required energy for the lime process (~135 as oppose to ~250 kJ/mol $CO_2$). In the lime cycle, the calcinations reaction consumes the most energy, and heat recovery from the calcination reaction products is poor. In the titanate cycle, however, most of the energy consumed for heating the reactants can theoretically be recovered by cooling of the reaction products. It should however be mentioned that because the energy requirement for heating and cooling of reactants and products are larger in the titanate process, the requirement on the heat transfer is more stringent.

Titanate processes may supply rather high concentrations of regenerated sodium hydroxide solution (~5M, for example) compared to conventional causticization (maximum 3.5M for example). This is because in conventional causticization using lime ($Ca(OH)_2$), the alkalinity of the NaOH solution produced due to reaction [1] is limited by the causticization reaction to 1M. For an air capture system, however, a more concentrated hydroxide solution, e.g. 3 or 5M, might be required depending on relative humidity (RH) and ambient temperature. Another issue with causticizing a concentrated alkaline reservoir solution with lime is the coprecipitation of calcium hydroxide with calcium carbonate. For these reasons, the conventional causticization using lime might not be as efficient for the concentrated reservoir solution as it is for causticizing sodium carbonate from a more dilute solution.

An energy efficient process for recovering sodium hydroxide for capturing $CO_2$ from ambient air is disclosed in this document. In some embodiments, the proposed process requires about half of the energy for the conventional causticization process using lime ($Ca(OH)_2$). The heat requirement of the proposed process is similar to the heat requirement for the sorbent regeneration for an amine-based $CO_2$ (MEA) capture system (for which an average of ~132 kJ/mol $CO_2$ has been reported) for power plants. The heat required for the use described herein may be high grade heat. Another potential advantage of this process over the conventional causticization process may be the lower temperature level, ~50 to 100° C., which may allow the heat integration between a high temperature gas cooled reactor from nuclear plants and the decarbonation reactor. Moreover, regeneration of concentrated sodium hydroxide may allow the contactor to significantly minimize the water loss.

Referring to FIG. 2, an embodiment of the method is illustrated. FIG. 1 illustrates a schematic sketch of an embodiment of the proposed process for the regeneration step in capturing $CO_2$ from air. A more detailed flow sheet is illustrated in FIG. 2. In the contactor, $CO_2$ is absorbed into a concentrated NaOH solution and converted to aqueous sodium carbonate. The reservoir solution is sent to the regeneration step which is composed of precipitation and causticization steps.

As it is shown in FIG. 5, in general, the solubility curve for sodium carbonate in presence of sodium hydroxide in the solution follows the same pattern as the solubility curve for $Na_2CO_3$-water system. The higher concentration of NaOH, as expected, significantly lowers the solubility. This allows for precipitation of anhydrous sodium carbonate below the boiling point of the solution.

Studies of the direct causticization of sodium carbonate with titanium dioxide have been carried out. Depending on the feed molar ratio and temperature, the reaction between $Na_2CO_3$ and $TiO_2$ can lead to various sodium titanates as products. It has been found that the main decarbonization reaction in the direct causticization based on $TiO_2$ is the reaction between $Na_2CO_3$ and $Na_2O.3TiO_2$, i.e. reaction [4].

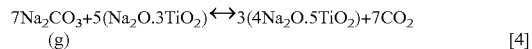

$$7Na_2CO_3 + 5(Na_2O.3TiO_2)_{(g)} \leftrightarrow 3(4Na_2O.5TiO_2) + 7CO_2 \quad [4]$$

$\Delta H_{850°C,s} = 90$ kJ/mol $CO_2$ $\Delta H_{850°C,l} = 65$ kJ/mol $CO_2$

The formed sodium penta-titanate, $4Na_2O.5TiO_2$, can then be hydrolyzed, see equation [5], in a leaching unit at temperatures of about 100° C., to sodium hydroxide and sodium tri-titanate, the latter of which is recycled to the causticization unit.

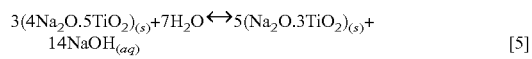

$$3(4Na_2O.5TiO_2)_{(s)} + 7H_2O \leftrightarrow 5(Na_2O.3TiO_2)_{(s)} + 14NaOH_{(aq)} \quad [5]$$

$\Delta H_{100°C} = 15.2$ kJ/mol $CO_2$

The kinetics of titanate reaction on a potassium-based process has been investigated, motivated by the possibility that that potassium carbonate might offer benefits over sodium carbonate in the pulping process such as the elimination of potassium build-up in sodium-based pulping. The kinetics of the reaction for absorbing $CO_2$ from air using potassium hydroxide is similar to a sodium-based process, and that the rate constant for capturing $CO_2$ from air using potassium hydroxide may, in some conditions, be approximately twice as large as that for sodium hydroxide. Thus, in some embodiments the air capture process may be based on potassium hydroxide.

The conventional titanate process cannot be directly applied to traditional air capture, however, because it requires pure and dry anhydrous sodium carbonate, and it is not obvious how to extract solid sodium carbonate from the rich solution of sodium hydroxide and sodium carbonate coming from the air capture contactor. This solution would typically have 1-4 M NaOH and less than 1 M of dissolved $Na_2CO_3$. A major focus of this document, therefore, is on separation of anhydrous sodium carbonate from a concentrated alkaline reservoir solution, and preparation of a well-mixed stream of solid sodium carbonate and sodium tri-titanate, the latter is the reagent for decarbonizing of sodium carbonate via reaction [4]. This is a necessary step for applying the titanate process to air capture. After describing the process for recovering solid $Na_2CO_3$, disclosed is an end-to-end energy and exergy analysis for the regeneration of NaOH via direct causticization using titanate as an alternative to conventional causticization.

Crystallization of $Na_2CO_3.10H_2O$

A 28% wt of sodium carbonate solution was prepared by dissolving 7.85 g anhydrous sodium carbonate into 20.24 g deionized water (while stirring with a magnetic stirrer) and was heated to about 40° C. to assure the complete dissolution of sodium carbonate. The solution of sodium carbonate was left at room temperature, ~22° C., for a day. The big chunk of crystal produced was weighed and analyzed by XRD (shown in FIG. 10). The weight of the crystal was 5.7 g. Assuming this was deca-crystal, the weight would correspond to 2.1 g $Na_2CO_3$, which means that 26% of initial sodium carbonate is precipitated. Referring to FIG. 11, the 26% is almost equal to expected changes in wt % from the solubility curve if the solution is cooled from ~40 to ~22° C. 1.48 g of the crystal was then heated in an oven at 100° C., after which the weight change was 0.88. The weight change was identical to the amount of water which would be vaporized if all the 1.48 g was sodium carbonate decahydrate, $Na_2CO_3.10H_2O$. This is a fair, simple analysis to illustrate that the crystal is $Na_2CO_3.10H_2O$.

Referring to FIG. 10, the crystal was also analyzed by XRD (X-ray diffractometery). The red bars represent the decacarbonate peaks. The XRD also detected mono-hydrate structure. It should be mentioned that the Deca crystallizes at temperatures of ~20 to 5° C., and it has been reported that at temperature of about 10° C., the yield is more than 90%.

Leaching/Crystallization

Two trials were performed, with $NaOH_{final}$=3M, $Na_2CO_{3, initial}$=3M in the first trial, and $NaOH_{final}$=5M, $Na_2CO_{3,initial}$=3M in the second trial. Referring to FIG. 5, the solubility of $Na_2CO_3$ in water and in NaOH solution at different concentrations is illustrated. Note: as the concentration of NaOH increases, the solubility curve shifts, and so the solubility of $Na_2CO_3$ decreases with increasing NaOH.

Precipitation/Leaching

Referring to FIG. 12, the goal here was to precipitate $Na_2CO_3(s)$ from $Na_2CO_3(aq)$ solution with the simultaneous leaching of NaOH from sodium penta-titanate. The leaching reaction can be illustrated as equation [5] above. Sodium penta-titanate was prepared by mixing a stoichiometric ratio of $Na_2CO_3$ and $TiO_2$ and heating up to ~920° C. to achieve a complete conversion according to equation [4]. Several leaching tests were then carried out. Anhydrous $Na_2CO_3$ was precipitated when a total of 3M NaOH was leached at T=~100° C., and anhydrous $Na_2CO_3$ was precipitated when a total of 5M NaOH was leached at T=~100° C.

In the making of the penta-titanate, the reaction temperature was 920° C., and the time was 2 hours. The expected penta-titanate was 80 g, and the amount produced was 78.73 g.

In the leaching experiment, a reaction flask fitted with a condenser was filled with water and sodium carbonate (which is dissolved in water at elevated temperature). The reaction flask was heated in a hot oil bath to the desired temperature. Sodium penta-titanate was added at a temperature of 103° C., and the mixture was heated and stirred for 2 hours. The condenser prevented water vapor from being removed from the system.

Filtering: Filter Cake

The suspension with white precipitate produced was then filtered and dried at 100° C. in an oven. Note that sodium carbonate monohydrate, $Na_2CO_3.H_2O$ decomposes to anhydrous sodium carbonate, $Na_2CO_3$ and water at T=~150° C. Referring to FIG. 13, the XRD for the filter cake from the leaching test where the final concentration of NaOH is 5M is illustrated. The light blue peak represents sodium tri-titanate (the highest intensity is at 2-theta of 10). It also shows that some sodium penta-titanate might be present. The XRD certainly shows the presence of anhydrous $Na_2CO_3$. Referring to FIG. 14, the XRD for the filter cake from the leaching test where the final cons of NaOH was 3M is illustrated. The light blue peak represents sodium tri-titanate (the highest intensity is at 2-theta of 10). It also shows that some sodium penta-titanate might be present. The XRD certainly shows the presence of anhydrous $Na_2CO_3$.

Filtrates from Filtering the Suspension

After centrifuging the filtrate, a titration was performed to analyze the concentration of dissolved carbonate anions as well as hydroxides. Referring to FIG. 15, an example of the titration data is illustrated. As illustrated, the measured values of hydroxide and carbonate (2.60 and 1.8 M, respectively) are very close to the expected values (3.0 and 1.6 M, respectively). The expected values may be derived from the solubility graph illustrated in FIG. 5. This demonstrates that the experiment has worked properly. Furthermore, leaching of NaOH can simultaneously proceed with the precipitation of $Na_2CO_3$.

Process Design—Description

Method: Simultaneous Leaching and Crystallization, as shown in FIG. 8.

1. Air contactor: The component of the system that provides the contacts between $CO_2$ and sodium hydroxide. In some embodiments, it can absorb $CO_2$ with a concentration of ~400 ppm in air to ~200 ppm in the exit flow (50% capture rate).

2. Reservoir: contains a mixed solution of NaOH and $Na_2CO_3$, the concentration of NaOH can vary from, for example, 1 to 5M and the corresponding concentration of $Na_2CO_3$ can vary from, for example, 2.5M to 0.2M depending on the ambient temperature, see Table 4. Note: At low NaOH concentrations the contactor loses water to the air and at sufficiently high concentrations it absorbs water. Therefore, in some embodiments, to minimize water loss one may vary the NaOH concentration so as to minimize or eliminate the need for make-up water.

HX: Heat Exchanger/Heat pump. Note: In practice, for example, a combination of heat exchanger and an ammonia type heat pump may be integrated so as to minimize energy and capital costs.

3. Sodium carbonate decahydrate extraction: in this unit, sodium carbonate decahydrate, $Na_2CO_3.10H_2O$, can be separated from a closely saturated solution of $Na_2CO_3$—NaOH, by a temperature swing which forces crystallization of the decahydrate. Various types of crystallization units can be used, including a draft tube baffle crystallizer or a fluidized pellet bed reactor known as a "crystalactor". Pure, almost alkaline-free salt can be produced with moisture content of only 5-10% after atmospheric drying. Note: The size of the required temperature swing depends on 1) the reservoir operating temperature, and 2) the reservoir operating carbonate concentration. Lower temperature swings are needed as the operating temperature rises. Running the reservoir with carbonate close to saturation minimizes the energy required for the temperature swing, but if the concentration is too close to saturation there can be carbonate precipitation in the contactor.

4. Dissolving/crystallization/leaching: this is a hybrid unit in which: crystals of sodium carbonate decahydrate are dissolved in warm water to a total concentration of ~30% wt providing a pH level of about 12, $$Na_2CO_3.10H_2O_{(s)}+H_2O \rightarrow Na^+, CO_3^{-2}+11H_2O$$

sodium hydroxide is leached from the added sodium penta-titanate, NT5, $$3(NT5)_{(s)}+7H_2O \rightarrow 5(NT3)_{(s)}+14NaOH_{(aq)}$$

anhydrous sodium carbonate is precipitated due to presence of sodium hydroxide in 4.2 which can decrease the solubility of sodium carbonate.

E: Evaporative unit: for further crystallization of sodium carbonate to concentrations<0.75M and for balancing the amount of water produced when dissolving sodium carbonate decahydrate. In some embodiments, this unit might use osmosis rather than evaporation. If evaporation is used, heat recovery can be maximized HX: Heat Exchanger.

5. Decarbonization reactor or kiln: is the main component of the decarbonization system where separated anhydrous sodium carbonate reacts in a fluidized bed type reactor with the decarbonizing agent (sodium tri-titanate, NT3) via the following reaction and $CO_2$ is liberated as a pure stream.

$$7Na_2CO_{3(s)} + 5(NT3)_{(s)} \rightarrow 3(NT5)_{(s)} + 7CO_{2(g)}$$

Several kiln configurations are possible including, for example, (a) indirect natural gas firing with no $CO_2$ recovery from the natural gas, (b) natural gas or coal syngas with oxy-fuel, and (c) indirect heat from a High Temperature Gas Cooled Reactor (e.g., PBMR). The choice of kiln depends on the size of the titanate particles. Possibilities include flash calcination, fluidized bed and the 'D' kiln falling particle designs.

TABLE 4

Concentration range for the streams from reservoir and to the first crystallization unit:

| Ambient T (° C.) | NaOH concentration in reservoir (mol/L) | Maximum Carbonate Concentration in (mol/L) | T swing (ΔT, ° C.) | Carbonate Concentration out (mol/L) | Precipitated carbonate (ΔC) |
|---|---|---|---|---|---|
| 30 | 5 | 0.9 | 20 | 0.42 | 0.48 |
| 25 | 5 | 0.85 | 15 | 0.42 | 0.43 |
| 20 | 3 | 1 | | 0.55 | 0.45 |
| | 5 | 0.75 | 10 | 0.42 | 0.33 |
| 15 | 3 | 0.75 | | 0.55 | 0.2 |
| | 5 | 0.55 | 5 | 0.42 | 0.13 |

Modified original method: separate leaching and crystallization (as shown in FIG. 9).

Blocks 1, 2, 3 and 5 in FIG. 9, are identical to the corresponding blocks in FIG. 8. Blocks 4A and 6 are described as below:

4A. Anhydrous sodium carbonate extraction: Anhydrous sodium carbonate can be extracted via various techniques such as:

4.1. Thermal decomposition of solid sodium carbonate decahydrate to anhydrous sodium carbonate and water vapor.

4.2. Dissolving solid sodium carbonate decahydrate in water, and crystallizing sodium carbonate monohydrate at elevated temperature followed by thermal decomposition of sodium carbonate monohydrate crystals.

4.3. Dissolving sodium carbonate decahydrate in water, processing it through an osmosis process from which clean water is separated from sodium carbonate aqueous solution. The water can be used in leaching unit 6. In some embodiments, separated sodium carbonate solution can go to an evaporative crystallization where anhydrous sodium carbonate can be crystallized.

6. Leaching: in this unit sodium hydroxide is leached out from sodium pentatitanate, NT5, by the water that was separated from evaporation/osmosis process in unit 4.

Other Non-Limiting Options

Potassium: Air capture may also be achieved with potassium solution. KOH has a rate constant for capturing $CO_2$ from air that, in some conditions, may be approximately twice as large as that for NaOH. This might substantially lower the cost of the contactor. It is not possible to use the conventional calcium causticization cycle for potassium carbonate, but it is possible to use a titanate process. Therefore, the methods disclosed herein may be used with any air capture process based on KOH with titanate caustic recovery.

In some embodiments, other air capture process which sequester $CO_2$ through reaction with NaOH my be utilized with the methods described herein. Non-limiting examples of air capture processes include those which use NaOH in a concentration between 1-5 M. The $Na_2CO_3$ formed through the reaction of $CO_2$ and NaOH may be extracted using, for example, a two-step extraction method. Non-limiting examples of extraction methods include temperature swings which lead to a solubility swing. In some embodiments, a solubility swing can be induced either through the introduction of NaOH or an increase in pressure. In some embodiments, a fluidized pellet reactor or crystalactor can be used to produce larger crystals which can facilitate separation of Na2CO3 while reducing liquid carry-over.

In some embodiments, the decarbonization process can be performed at temperatures slightly below melting point of anhydrous sodium carbonate, ~850° C., or at temperatures slightly above melting point of anhydrous sodium carbonate, ~860° C.

In some embodiments, leaching of the regenerated NaOH in a concentrated solution from sodium pentatitanate can be performed using water at ~100° C. In other embodiments, a mixture of sodium hydroxide and carbonate solution is leached from a reservoir tank at a temperature of ~100° C.

A method of carbon dioxide capture is also disclosed. In a step (a), a gas containing carbon dioxide is scrubbed with an aqueous solution of an alkali metal hydroxide to react the carbon dioxide to form a first aqueous solution containing an alkali metal carbonate. In a step (b), anhydrous alkali metal carbonate is separated from the first aqueous solution. In a step (c) the anhydrous alkali metal carbonate is treated by causticization to generate carbon dioxide and alkali metal hydroxide. In some embodiments, the alkali metal comprises at least one alkali metal. In some embodiments, the alkali metal hydroxide comprises potassium hydroxide. This way, for example, a potassium system may be used instead of, or in combination with, a sodium system. In some embodiments, the alkali metal hydroxide comprises sodium hydroxide. In some embodiments, step (c) further comprises treating the anhydrous alkali metal carbonate by causticization with an alkali metal tri-titanate to generate carbon dioxide and alkali metal hydroxide. The alkali metal of the alkali metal tri-titanate may comprise at least one alkali metal. In some embodiments, the alkali metal tri-titanate may comprise sodium tri-titanate.

Influence of Temperature

As shown in FIG. 16, at 1000° C. a second weight loss is observed which, according to literature, is due to reaction [13]:

$$Na_2CO_{3(l)} + (4Na_2O.5TiO_2)_{(s)} \leftrightarrow 5(Na_2O.TiO_2)_{(s)} + CO_{2(g)} \quad [13]$$

As stated earlier (Zou, 1991), this reaction does not occur at temperatures below 1000° C. in presence of $CO_2$.

Influence of Steam

The effect of steam on decarbonization reaction [4] at 900° C. and 1000° C. was studied in 20 and 60% steam in the reaction atmosphere. These studies concluded that the presence of steam does not significantly affect the reaction. FIG. 17 shows the effect of steam at 900° C. As is shown, the presence of steam slightly lowers the temperature at which the reaction starts. Reports in the literature, on the other hand, have reported complete decarbonization conversion is possible under steam gasification of black liquor at 715° C. and in the presence of 5% or less $CO_2$ in the gas phase. These studies, therefore suggest implementation of a steam reformer in direct causticization-gasification processes to maintain a low concentration of $CO_2$ in the gas phase.

Figure 17A:
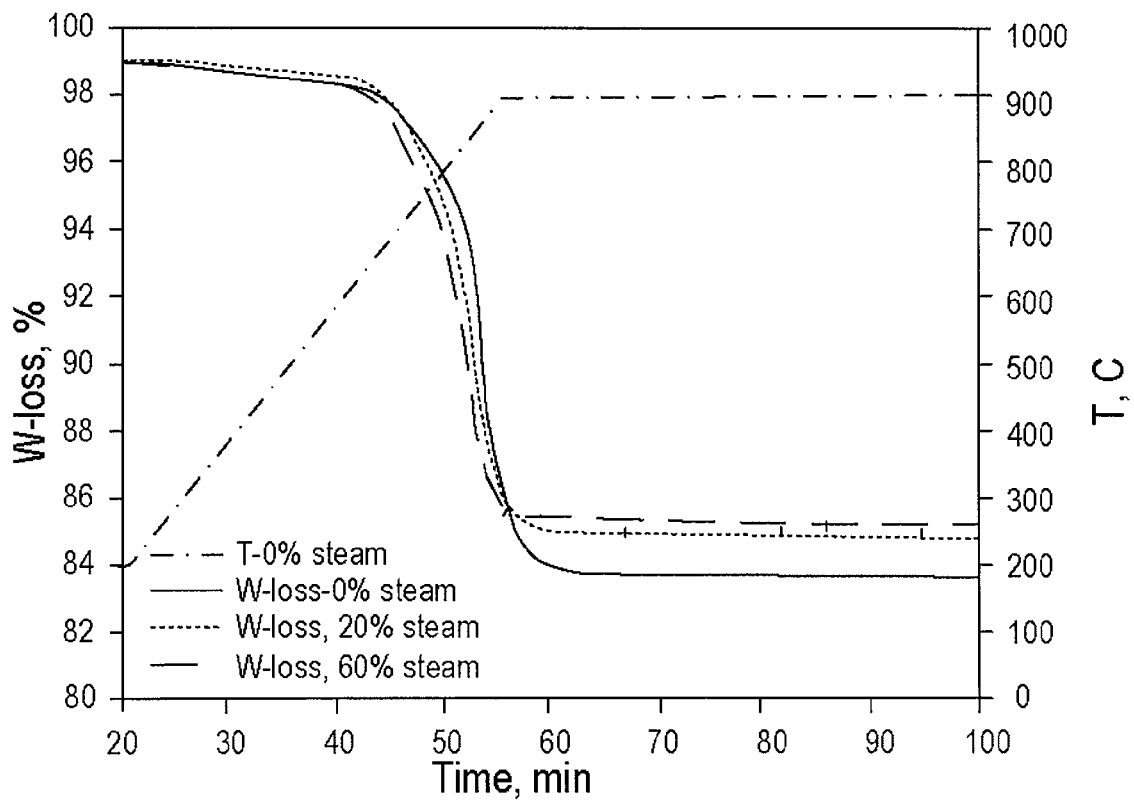
Figure 17B:
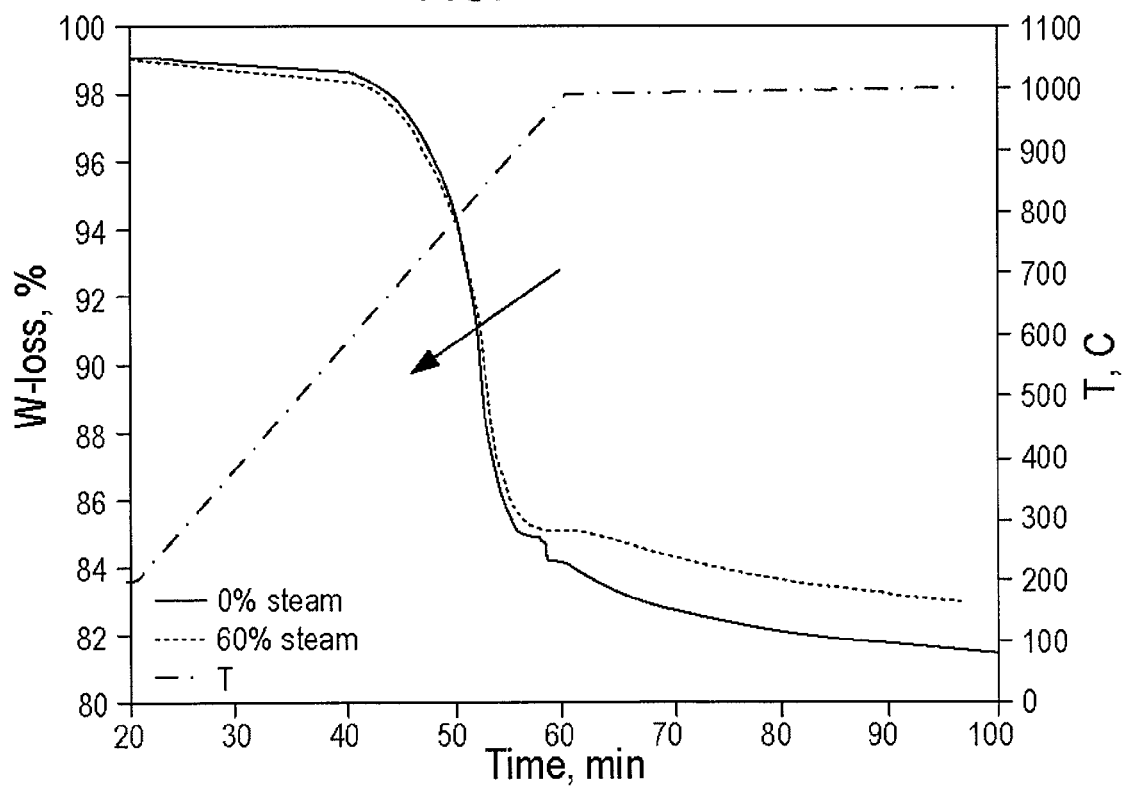

Although the presence of steam lowers the temperature at which the reaction starts, FIG. 17(a), it decreases the final conversion of reaction by about 2%. At higher temperatures, e.g. 1000° C. as in FIG. 17(b), the presence of steam does not significantly change the temperature at which the reaction starts. FIG. 17(b), however, shows that the second weight loss due to reaction [13] at 1000° C. is hindered in presence of steam.

Influence of $CO_2$

Figure 18A:
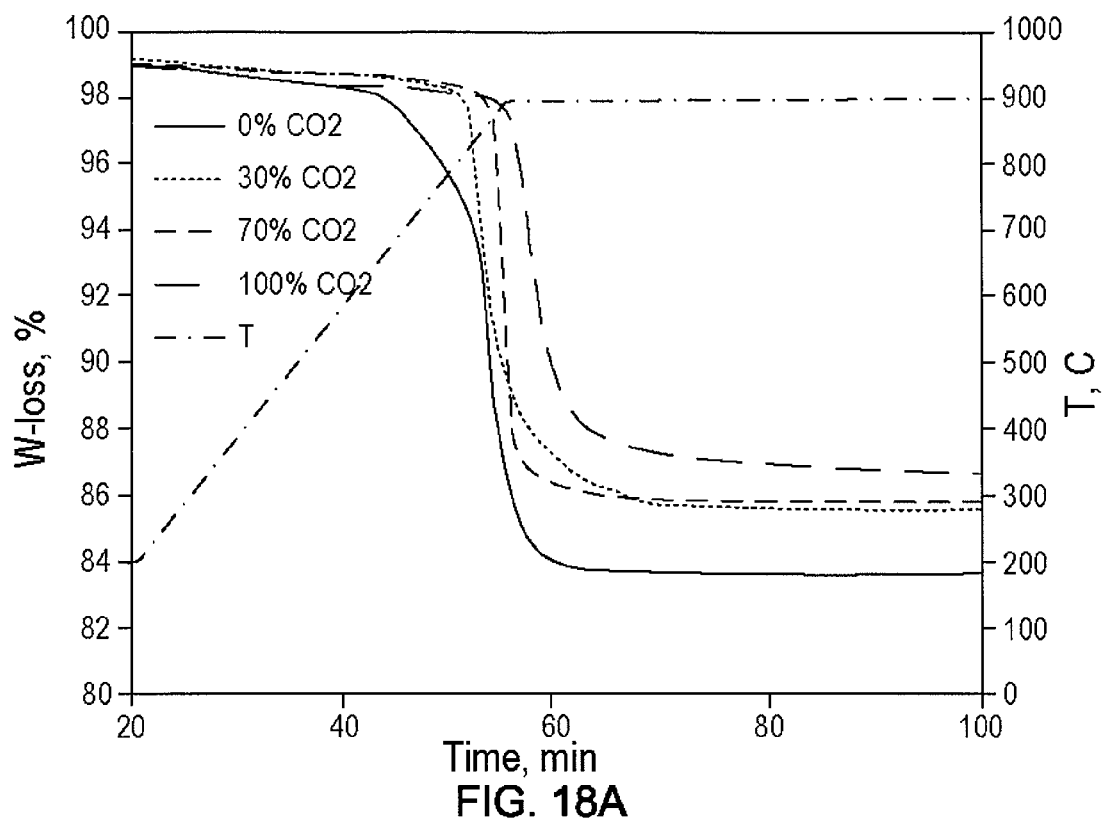
Figure 18B:
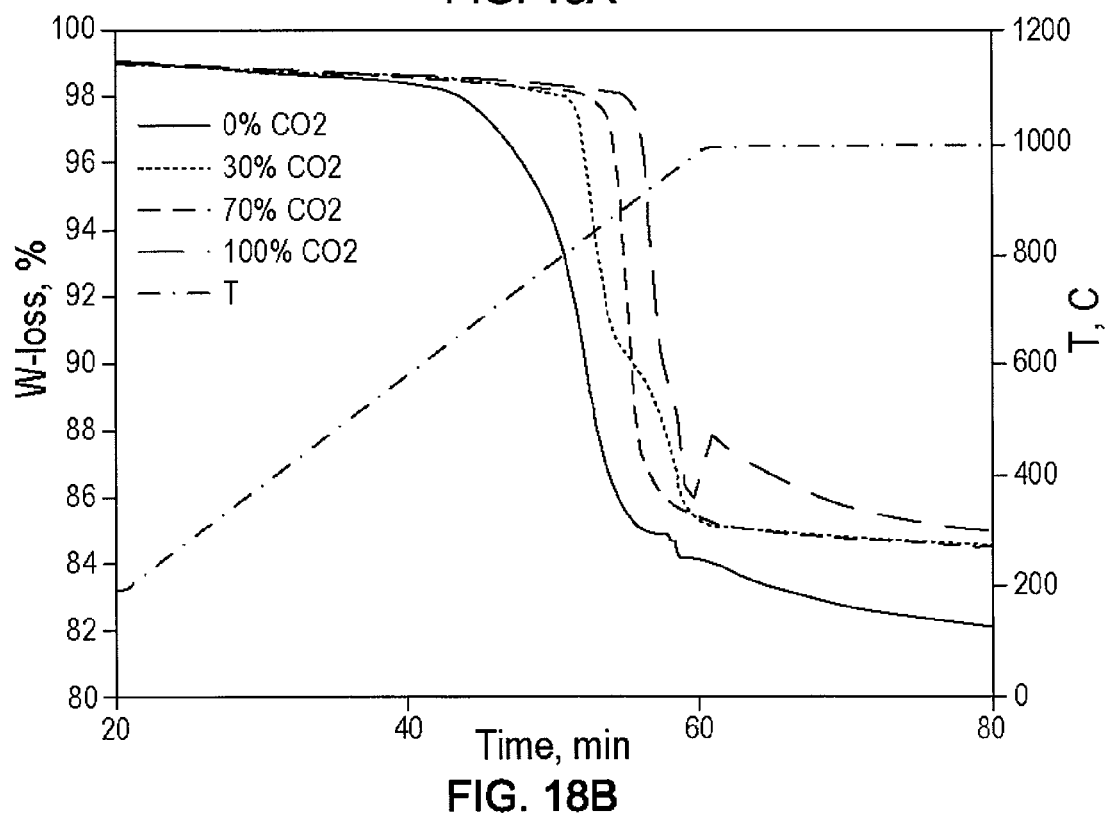

As shown in FIG. 18(a) and 18(b), the effect of $CO_2$ on decarbonization reaction [4] at two different temperatures, 900° C. and 1000° C. is illustrated.

In the absence of $CO_2$ at 900° C. (FIG. 18(a)), the reaction starts at about 700° C. which is in agreement with earlier studies and it goes to completion within a few minutes as the temperature approaches about 850° C. In higher partial pressure of $CO_2$, however, the reaction starts at higher temperature, e.g. in 30% $CO_2$ the reaction starts at about 800° C. and in 100% $CO_2$ the reaction does not start until about 900° C. Without being bound by theory, this may imply that at higher concentrations of $CO_2$, dissociation reaction [1]:

$$Na_2CO_{3(l)} \leftrightarrow Na_2O_{(l)} + CO_{2(g)} \qquad [1]$$

is shifted to the left which makes sodium carbonate stable at higher temperatures, depending on the concentration of $CO_2$, this temperature can vary from 800° C. to 900° C. In some embodiments, causticization occurs in the presence of at least 10% $CO_2$. In some embodiments, causticization occurs in the presence of between about 30 and about 50% $CO_2$.

The processes disclosed herein may be tailored to the specific chemical species present in addition to the ones mentioned here. The chemical species refers to, for example, the alkali metal hydroxide, the secondary solute, and any other species dissolved in a solution used herein. Referring to FIG. 4, for example, different alkali metal carbonates would have differently shaped precipitation graphs. In addition, for these different species, the transition temperature (FIG. 6) and saturation concentrations (FIGS. 4 and 5) would have to be adjusted accordingly.

In the claims, the word "comprising" is used in its inclusive sense and does not exclude other elements being present. The indefinite article "a" before a claim feature does not exclude more than one of the feature being present. As used herein, "about" is meant to account for variations due to experimental error. All measurements reported herein are understood to be modified by the term "about", whether or not the term is explicitly used, unless explicitly stated otherwise. As would be clear to one of ordinary skill in the art, based on the disclosure of the specification, the unit "% wt" is meant to represent weight percent.

Each one of the individual features described here may be used in one or more embodiments and is not, by virtue only of being described here, to be construed as essential to all embodiments as defined by the claims.

What is claimed:

1. A method, comprising:
   separating a hydrate of sodium carbonate from a first aqueous solution formed by reacting carbon dioxide and sodium hydroxide, wherein the first aqueous solution includes sodium hydroxide and sodium carbonate;
   dissolving the hydrate of sodium carbonate in a second aqueous solution that includes sodium hydroxide and sodium carbonate, wherein the dissolving occurs in the presence of sodium penta-titanate added to the second aqueous solution;
   heating the second aqueous solution to at least a transition temperature of monohydrate sodium carbonate and anhydrous sodium carbonate precipitation to produce anhydrous sodium carbonate, wherein the transition temperature is less than the boiling point of water at standard atmospheric pressure and wherein the sodium penta-titanate hydrolyzes to form sodium tri-titanate and sodium hydroxide; and
   causticizing the produced anhydrous sodium carbonate to generate carbon dioxide and sodium hydroxide.

2. A method of claim 1, wherein the causticizing comprises:
   reacting the anhydrous sodium carbonate with sodium tri-titanate to produce carbon dioxide gas and sodium penta-titanate; and
   regenerating sodium hydroxide and sodium tri-titanate from the sodium penta-titanate.

3. A method of claim 2, in which reacting with sodium tri-titanate is carried out at temperatures at or above the melting point of anhydrous sodium carbonate.

4. A method of claim 1, in which the first aqueous solution is formed by scrubbing a gas containing carbon dioxide with an aqueous solution of sodium hydroxide.

5. A method of claim 2, further comprising:
   separating additional anhydrous sodium carbonate solution formed by reacting additional carbon dioxide with the sodium hydroxide remaining in the first aqueous solution after the first separation of anhydrous sodium carbonate; and
   causticizing the additional anhydrous sodium carbonate to generate carbon dioxide and sodium hydroxide.

6. A method of claim 5, further comprising hydrolyzing the sodium penta-titanate.

7. A method of claim 1, in which the concentration of sodium carbonate in the first aqueous solution is lower than the concentration of sodium carbonate in the second aqueous solution.

8. A method of any claim 1, in which separating further comprises cooling the first aqueous solution to separate the hydrate of sodium carbonate from the first aqueous solution.

9. A method of claim 1, in which the anhydrous sodium carbonate is produced at elevated pressure.

10. A method of claim 1, in which the hydrate of sodium carbonate comprises sodium carbonate decahydrate.

11. A method of claim 1, in which the pH of the first aqueous solution is high enough during causticizing to reduce co-crystallization of sodium bicarbonate.

12. A method of claim 1, in which the causticizing occurs in the presence of at least 10% carbon dioxide.

13. A method of claim 1 in which the causticizing occurs in the presence of steam.

14. A method comprising:
   (a) scrubbing a gas that includes carbon dioxide with an aqueous solution of sodium hydroxide to react the carbon dioxide to form a first aqueous solution that includes sodium hydroxide and sodium carbonate;
(b) separating anhydrous sodium carbonate from the first aqueous solution, the separating comprising:
separating a hydrate of sodium carbonate from the first aqueous solution;
dissolving the hydrate of sodium carbonate in a second aqueous solution that includes sodium hydroxide and sodium carbonate, wherein the dissolving occurs in the presence of sodium penta-titanate added to the second aqueous solution;
heating the second aqueous solution to at least a transition temperature of monohydrate sodium carbonate and anhydrous sodium carbonate precipitation to produce anhydrous sodium carbonate, wherein the transition temperature is less than the boiling point of water at standard atmospheric pressure and wherein the sodium penta-titanate hydrolyzes to form sodium tri-titanate and sodium hydroxide; and
(c) treating the anhydrous sodium carbonate by causticization to generate carbon dioxide and sodium hydroxide.

15. A method of claim 14 further comprising: treating the anhydrous sodium carbonate by causticization with sodium tri-titanate to generate carbon dioxide and sodium hydroxide.

16. A method comprising:
(a) scrubbing a gas that includes carbon dioxide with an aqueous solution of alkali metal hydroxide resulting in a first aqueous solution that includes alkali metal carbonate and the alkali metal hydroxide;
(b) separating anhydrous alkali metal carbonate from the first aqueous solution, the separating comprising:
separating a hydrate of alkali metal carbonate from the first aqueous solution;
dissolving the hydrate of alkali metal carbonate in a second aqueous solution that includes alkali metal hydroxide and alkali metal carbonate, wherein the dissolving occurs in the presence of sodium penta-titanate added to the second aqueous solution;
heating the second aqueous solution to at least a transition temperature of monohydrate alkali metal carbonate and anhydrous alkali metal carbonate precipitation to produce anhydrous alkali metal carbonate, wherein the transition temperature is less than the boiling point of water at standard atmospheric pressure and wherein the sodium penta-titanate hydrolyzes to form sodium tri-titanate and alkali metal hydroxide; and
(c) treating the anhydrous alkali metal carbonate by causticization to generate carbon dioxide and alkali metal hydroxide.

17. A method comprising:
(a) scrubbing a gas that includes carbon dioxide with an aqueous solution of sodium hydroxide to react the carbon dioxide to form a first aqueous solution that includes sodium hydroxide and sodium carbonate;
(b) separating anhydrous sodium carbonate from the first aqueous solution, the separating comprising:
separating a hydrate of sodium carbonate from the first aqueous solution;
dissolving the hydrate of sodium carbonate in a second aqueous solution that includes sodium hydroxide and sodium carbonate, wherein the dissolving occurs in the presence of sodium penta-titanate added to the second aqueous solution;
heating the second aqueous solution to at least a transition temperature of monohydrate sodium carbonate and anhydrous sodium carbonate precipitation to produce anhydrous sodium carbonate, wherein the transition temperature is less than the boiling point of water at standard atmospheric pressure and wherein the sodium penta-titanate hydrolyzes to form sodium tri-titanate and sodium hydroxide; and
(c) treating the anhydrous sodium carbonate by causticization to generate carbon dioxide and sodium hydroxide, wherein the carbon dioxide that is formed exclusively comes from the scrubbed gas.

* * * * *